(12) United States Patent
Petersen et al.

(10) Patent No.: US 8,898,288 B2
(45) Date of Patent: Nov. 25, 2014

(54) STATUS UPDATE PROPAGATION BASED ON CROWD OR POI SIMILARITY

(75) Inventors: Steven L. Petersen, Los Gatos, CA (US); Kunal Kandekar, Jersey City, NJ (US)

(73) Assignee: Waldeck Technology, LLC, Wilmington, DC (US)

( * ) Notice: Subject to any disclaimer, the term of this patent is extended or adjusted under 35 U.S.C. 154(b) by 456 days.

(21) Appl. No.: 13/037,520

(22) Filed: Mar. 1, 2011

(65) Prior Publication Data

US 2012/0066316 A1 Mar. 15, 2012

Related U.S. Application Data

(60) Provisional application No. 61/309,903, filed on Mar. 3, 2010.

(51) Int. Cl.
*G06F 15/16* (2006.01)
*G06F 17/30* (2006.01)
*H04L 29/08* (2006.01)

(52) U.S. Cl.
CPC .......... *H04L 67/22* (2013.01); *G06F 17/30185* (2013.01); *G06F 17/30144* (2013.01); *G06F 17/30017* (2013.01); *G06F 17/30206* (2013.01)
USPC ........... 709/224; 709/204; 709/205; 709/206; 715/753; 705/319; 455/456.2; 455/456.3

(58) Field of Classification Search
CPC ......... H04L 67/22; H04L 67/18; H04L 67/24; G06Q 50/01; H04W 4/206
USPC ........... 709/204–206, 224; 715/753; 705/319; 455/456.2–456.3
See application file for complete search history.

(56) References Cited

U.S. PATENT DOCUMENTS 5,519,608 A 5/1996 Kupiec
5,539,232 A 7/1996 Nakanishi et al.
(Continued)

FOREIGN PATENT DOCUMENTS

EP 1463354 12/2005
WO WO 01/039506 5/2001
(Continued)

OTHER PUBLICATIONS

Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.
(Continued)

*Primary Examiner* — Alina N Boutah

(57) ABSTRACT

Systems and methods are provided for following status updates of users. In one embodiment, a requestor selects a crowd of users. In response, one or more crowds of users that match the selected crowd of users to at least a predefined threshold degree are identified. Status updates sent by users in at least one of the one or more matching crowds of users are then delivered to the requestor. In another embodiment, a requestor selects a Point of Interest (POI). In response, one or more POIs that match the selected POI to at least a predefined threshold degree are identified. Status updates sent by users located at one or more POIs of the one or more matching POIs are delivered to the requestor.

21 Claims, 25 Drawing Sheets

(56) References Cited

U.S. PATENT DOCUMENTS

| | | | |
|---|---|---|---|
| 5,696,962 A | 12/1997 | Kupiec | |
| 6,161,149 A | 12/2000 | Achacoso et al. | |
| 6,204,844 B1 | 3/2001 | Fumarolo et al. | |
| 6,240,069 B1 | 5/2001 | Alperovich et al. | |
| 6,385,602 B1 | 5/2002 | Tso et al. | |
| 6,480,885 B1* | 11/2002 | Olivier | 709/207 |
| 6,490,587 B2 | 12/2002 | Easty et al. | |
| 6,529,136 B2 | 3/2003 | Cao et al. | |
| 6,708,172 B1 | 3/2004 | Wong et al. | |
| 6,819,919 B1 | 11/2004 | Tanaka | |
| 6,968,179 B1 | 11/2005 | De Vries | |
| 6,987,885 B2 | 1/2006 | Gonzalez-Banos et al. | |
| 7,116,985 B2 | 10/2006 | Wilson et al. | |
| 7,123,918 B1 | 10/2006 | Goodman | |
| 7,158,798 B2 | 1/2007 | Lee et al. | |
| 7,236,739 B2 | 6/2007 | Chang | |
| 7,247,024 B2 | 7/2007 | Bright et al. | |
| 7,272,357 B2 | 9/2007 | Nishiga et al. | |
| 7,280,822 B2 | 10/2007 | Fraccaroli | |
| 7,398,081 B2 | 7/2008 | Moran | |
| 7,418,268 B1 | 8/2008 | Cabano et al. | |
| 7,423,580 B2 | 9/2008 | Markhovsky et al. | |
| 7,444,655 B2 | 10/2008 | Sardera | |
| 7,509,131 B2 | 3/2009 | Krumm et al. | |
| 7,558,404 B2 | 7/2009 | Ma et al. | |
| 7,620,404 B2 | 11/2009 | Chesnais et al. | |
| 7,676,585 B1 | 3/2010 | Francke et al. | |
| 7,680,959 B2 | 3/2010 | Svendsen | |
| 7,725,472 B2* | 5/2010 | Uchiyama | 707/758 |
| 7,787,886 B2 | 8/2010 | Markhovsky et al. | |
| 7,818,394 B1 | 10/2010 | Lawler et al. | |
| 7,818,396 B2 | 10/2010 | Dolin et al. | |
| 7,856,360 B2* | 12/2010 | Kramer et al. | 705/1.1 |
| 8,010,601 B2 | 8/2011 | Jennings et al. | |
| 8,019,692 B2* | 9/2011 | Rosen | 705/319 |
| 8,208,943 B2 | 6/2012 | Petersen et al. | |
| 2001/0013009 A1 | 8/2001 | Greening et al. | |
| 2002/0010628 A1 | 1/2002 | Burns | |
| 2002/0049690 A1 | 4/2002 | Takano | |
| 2002/0086676 A1 | 7/2002 | Hendrey et al. | |
| 2002/0087335 A1 | 7/2002 | Meyers et al. | |
| 2002/0184377 A1 | 12/2002 | Flavin | |
| 2003/0005056 A1 | 1/2003 | Yamamoto et al. | |
| 2003/0227479 A1 | 12/2003 | Mizrahi et al. | |
| 2004/0009750 A1* | 1/2004 | Beros et al. | 455/41.2 |
| 2004/0025185 A1 | 2/2004 | Goci et al. | |
| 2004/0158565 A1* | 8/2004 | Kakuta et al. | 707/10 |
| 2004/0181668 A1 | 9/2004 | Blew et al. | |
| 2004/0192331 A1 | 9/2004 | Gorday et al. | |
| 2005/0038876 A1* | 2/2005 | Chaudhuri | 709/219 |
| 2005/0055450 A1* | 3/2005 | Gang | 709/228 |
| 2005/0070298 A1 | 3/2005 | Caspi et al. | |
| 2005/0113123 A1 | 5/2005 | Torvinen | |
| 2005/0130634 A1 | 6/2005 | Godfrey | |
| 2005/0174975 A1 | 8/2005 | Mgrdechian et al. | |
| 2005/0210387 A1 | 9/2005 | Alagappan et al. | |
| 2005/0231425 A1 | 10/2005 | Coleman et al. | |
| 2006/0046743 A1* | 3/2006 | Mirho | 455/456.3 |
| 2006/0085419 A1* | 4/2006 | Rosen | 707/9 |
| 2006/0161599 A1* | 7/2006 | Rosen | 707/201 |
| 2006/0166679 A1 | 7/2006 | Karaoguz et al. | |
| 2006/0195361 A1* | 8/2006 | Rosenberg | 705/14 |
| 2006/0218153 A1 | 9/2006 | Voon et al. | |
| 2006/0229058 A1 | 10/2006 | Rosenberg | |
| 2006/0242291 A1* | 10/2006 | Nevalainen | 709/224 |
| 2006/0256959 A1 | 11/2006 | Hymes | |
| 2006/0270419 A1* | 11/2006 | Crowley et al. | 455/456.2 |
| 2006/0287766 A1 | 12/2006 | Kraft | |
| 2007/0005419 A1 | 1/2007 | Horvitz et al. | |
| 2007/0015518 A1 | 1/2007 | Winter et al. | |
| 2007/0030824 A1 | 2/2007 | Ribaudo et al. | |
| 2007/0032242 A1 | 2/2007 | Goodman | |
| 2007/0075898 A1 | 4/2007 | Markhovsky et al. | |
| 2007/0088832 A1* | 4/2007 | Tsang et al. | 709/227 |
| 2007/0135138 A1* | 6/2007 | Brown et al. | 455/456.3 |
| 2007/0142065 A1 | 6/2007 | Richey et al. | |
| 2007/0149214 A1 | 6/2007 | Walsh et al. | |
| 2007/0150444 A1 | 6/2007 | Chesnais et al. | |
| 2007/0167174 A1 | 7/2007 | Halcrow et al. | |
| 2007/0174243 A1 | 7/2007 | Fritz | |
| 2007/0179863 A1 | 8/2007 | Stoll | |
| 2007/0203644 A1 | 8/2007 | Thota et al. | |
| 2007/0210937 A1 | 9/2007 | Smith et al. | |
| 2007/0218900 A1 | 9/2007 | Abhyanker | |
| 2007/0220090 A1 | 9/2007 | Hall | |
| 2007/0233736 A1 | 10/2007 | Xiong et al. | |
| 2007/0250901 A1 | 10/2007 | McIntire et al. | |
| 2007/0255785 A1 | 11/2007 | Hayashi et al. | |
| 2007/0255807 A1 | 11/2007 | Hayashi et al. | |
| 2007/0281689 A1 | 12/2007 | Altman et al. | |
| 2007/0282621 A1 | 12/2007 | Altman et al. | |
| 2007/0290832 A1 | 12/2007 | Kalinichenko et al. | |
| 2008/0016018 A1 | 1/2008 | Malik | |
| 2008/0016205 A1 | 1/2008 | Svendsen | |
| 2008/0076418 A1 | 3/2008 | Beyer, Jr. | |
| 2008/0086741 A1 | 4/2008 | Feldman et al. | |
| 2008/0096589 A1 | 4/2008 | Klassen | |
| 2008/0097999 A1 | 4/2008 | Horan | |
| 2008/0106599 A1 | 5/2008 | Liu et al. | |
| 2008/0113674 A1 | 5/2008 | Baig | |
| 2008/0118106 A1 | 5/2008 | Kilambi et al. | |
| 2008/0140650 A1* | 6/2008 | Stackpole | 707/5 |
| 2008/0146250 A1 | 6/2008 | Aaron | |
| 2008/0155080 A1* | 6/2008 | Marlow et al. | 709/223 |
| 2008/0182563 A1 | 7/2008 | Wugofski et al. | |
| 2008/0182591 A1 | 7/2008 | Krikorian | |
| 2008/0183816 A1 | 7/2008 | Morris | |
| 2008/0188261 A1 | 8/2008 | Arnone | |
| 2008/0222295 A1 | 9/2008 | Robinson et al. | |
| 2008/0227473 A1 | 9/2008 | Haney | |
| 2008/0242317 A1 | 10/2008 | Abhyanker | |
| 2008/0250312 A1 | 10/2008 | Curtis | |
| 2008/0282286 A1 | 11/2008 | Or | |
| 2008/0288355 A1* | 11/2008 | Rosen | 705/14 |
| 2008/0306826 A1 | 12/2008 | Kramer et al. | |
| 2008/0318597 A1 | 12/2008 | Berns et al. | |
| 2009/0005040 A1* | 1/2009 | Bourne | 455/435.1 |
| 2009/0006551 A1 | 1/2009 | Guday et al. | |
| 2009/0023410 A1 | 1/2009 | Ghosh | |
| 2009/0024315 A1 | 1/2009 | Scheibe | |
| 2009/0029718 A1 | 1/2009 | Nilsson | |
| 2009/0030999 A1 | 1/2009 | Gatzke et al. | |
| 2009/0047972 A1* | 2/2009 | Neeraj | 455/456.1 |
| 2009/0076894 A1 | 3/2009 | Bates et al. | |
| 2009/0082038 A1 | 3/2009 | McKiou et al. | |
| 2009/0112467 A1 | 4/2009 | Jiang et al. | |
| 2009/0115570 A1 | 5/2009 | Cusack, Jr. | |
| 2009/0115617 A1 | 5/2009 | Sano et al. | |
| 2009/0119603 A1 | 5/2009 | Stackpole | |
| 2009/0132652 A1 | 5/2009 | Athale et al. | |
| 2009/0138346 A1 | 5/2009 | Kalaboukis et al. | |
| 2009/0144211 A1 | 6/2009 | O'Sullivan et al. | |
| 2009/0144369 A1 | 6/2009 | Brown | |
| 2009/0150501 A1 | 6/2009 | Davis et al. | |
| 2009/0164431 A1 | 6/2009 | Zivkovic et al. | |
| 2009/0164459 A1 | 6/2009 | Jennings et al. | |
| 2009/0201896 A1 | 8/2009 | Davis et al. | |
| 2009/0210480 A1 | 8/2009 | Sivasubramaniam et al. | |
| 2009/0248607 A1 | 10/2009 | Eggink et al. | |
| 2009/0258636 A1* | 10/2009 | Helvick | 455/414.2 |
| 2009/0265604 A1 | 10/2009 | Howard et al. | |
| 2009/0276500 A1* | 11/2009 | Karmarkar | 709/206 |
| 2009/0287646 A1 | 11/2009 | Maciocci | |
| 2009/0287687 A1 | 11/2009 | Martire et al. | |
| 2009/0287783 A1 | 11/2009 | Beare et al. | |
| 2009/0307263 A1 | 12/2009 | Skibiski et al. | |
| 2010/0004857 A1 | 1/2010 | Pereira et al. | |
| 2010/0017261 A1 | 1/2010 | Evans et al. | |
| 2010/0020776 A1 | 1/2010 | Youssef et al. | |
| 2010/0050202 A1* | 2/2010 | Kandekar et al. | 725/14 |
| 2010/0057577 A1 | 3/2010 | Stefik et al. | |
| 2010/0069035 A1 | 3/2010 | Johnson | |
| 2010/0070577 A1 | 3/2010 | Relyea et al. | |
| 2010/0070875 A1 | 3/2010 | Turski et al. | |

(56) References Cited

U.S. PATENT DOCUMENTS

| | | | |
|---|---|---|---|
| 2010/0113160 A1 | 5/2010 | Belz et al. | |
| 2010/0130226 A1 | 5/2010 | Arrasvuori et al. | |
| 2010/0131502 A1 | 5/2010 | Fordham | |
| 2010/0197318 A1 | 8/2010 | Petersen et al. | |
| 2010/0197319 A1 | 8/2010 | Petersen et al. | |
| 2010/0198814 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1* | 8/2010 | Jennings et al. | 707/769 |
| 2010/0198870 A1 | 8/2010 | Petersen et al. | |
| 2010/0198917 A1 | 8/2010 | Petersen et al. | |
| 2010/0205242 A1* | 8/2010 | Marchioro et al. | 709/203 |
| 2010/0211868 A1 | 8/2010 | Karmarkar et al. | |
| 2010/0228582 A1* | 9/2010 | King et al. | 705/7 |
| 2010/0287256 A1* | 11/2010 | Neilio | 709/217 |
| 2010/0299703 A1* | 11/2010 | Altman | 725/48 |
| 2010/0325218 A1* | 12/2010 | Castro et al. | 709/206 |
| 2011/0004692 A1* | 1/2011 | Occhino et al. | 709/228 |
| 2011/0055723 A1* | 3/2011 | Lightstone et al. | 715/752 |
| 2011/0136506 A1 | 6/2011 | Stewart | |
| 2011/0138304 A1* | 6/2011 | Ungerman | 715/753 |
| 2011/0151898 A1* | 6/2011 | Chandra et al. | 455/466 |
| 2011/0161427 A1* | 6/2011 | Fortin et al. | 709/206 |
| 2011/0213894 A1* | 9/2011 | Silberstein et al. | 709/232 |
| 2012/0009900 A1* | 1/2012 | Chawla | 455/411 |
| 2012/0041983 A1 | 2/2012 | Jennings | |
| 2012/0047102 A1* | 2/2012 | Petersen et al. | 706/52 |
| 2012/0047448 A1* | 2/2012 | Amidon et al. | 715/753 |
| 2012/0047565 A1* | 2/2012 | Petersen | 726/7 |
| 2012/0063367 A1* | 3/2012 | Curtis et al. | 370/270 |
| 2012/0063427 A1* | 3/2012 | Kandekar et al. | 370/338 |
| 2012/0064919 A1* | 3/2012 | Purdy | 455/456.3 |
| 2012/0066138 A1* | 3/2012 | Curtis et al. | 705/319 |
| 2012/0066231 A1* | 3/2012 | Petersen et al. | 707/748 |
| 2012/0066302 A1 | 3/2012 | Petersen et al. | |
| 2012/0072495 A1 | 3/2012 | Jennings et al. | |
| 2012/0179642 A1* | 7/2012 | Sweeney et al. | 706/55 |

FOREIGN PATENT DOCUMENTS

| | | |
|---|---|---|
| WO | WO 2008/000046 | 1/2008 |
| WO | WO 2009/039350 | 3/2009 |
| WO | WO 2009/055501 | 4/2009 |
| WO | WO 2009/077655 | 6/2009 |
| WO | WO 2010/006062 | 1/2010 |

OTHER PUBLICATIONS

Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

Anciaux, N. et al., "Data Degradation: Making Private Data Less Sensitive Over Time," CIKM 2008, Oct. 26-30, 2008, Napa Valley, California, 2 pages.

Abstract, Seeburger, J. And Schroeter, R., "Disposable Maps: Ad hoc Location Sharing," Proceedings of the 21st Annual Conference of the Australian Computer-Human Interaction Special Interest Group: Design: Open 24/7, Nov. 23-27, 2009, Melbourne, Australia, abstract found at <http://www.smartservicescrc.com.au/PDF/P09_042_abstract.pdf>, 1 page.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Fire Eagle," at <http://fireeagle.yahoo.net>, copyright 2007-2011, Yahoo! Inc., printed Apr. 28, 2011, 2 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"Friend of a Friend (FOAF) project," at <http://www.foaf-project.org/>, from the Internet Archive dated May 26, 2008, printed Aug. 10, 2012, 2 pages.

Newman, Jared, "Google's Realtime Search Update Does What Twitter Won't," PCWorld, Aug. 26, 2010, Retrieved from the internet: http://www.pcworld.com/article/204246/googles_realtime_search_update_does_what_twitter_wont.html.

Vihavainen et al., "'I can't lie anymore!': The Implications of Location Automation for Mobile Social Applications," Proceedings of MobiQuitous 2009, Jul. 13-16, 2009, Toronto, Canada, IEEE Press, found at <https://hiit.fi/~svihavai/vihavainen_oulasvirta_sarvas_mobiquitous09.pdf>, 10 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"LinkedIn: Relationships Matter," at <http://www.linkedin.com/>, date unknown but website dates back to at least 2003, copyright 2009, LinkedIn Corportaion, printed Jan. 22, 2009, 1 page.

"About Loopt," at <http://about.loopt.com/>, printed May 3, 2011, 4 pages.

"Loopt—About Us," at <https://loopt.com/loopt/aboutUs.aspx>, from the Internet Archive, dated Jun. 29, 2007, copyright 2007, Loopt, Inc., 1 page.

"MobiClique," copyright 2007-2009, Thomson, originally found at <http://www.thlab.net/~apietila/mobiclique/>, printed Oct. 23, 2009, 5 pages.

Abstract, Ratti, C. et al., "Mobile Landscapes: using location data from cell phones for urban analysis," Environment and Planning B: Planning and Design, vol. 33, No. 5, 2006, pp. 727-748, 1 page.

Page, X. and Kobsa, A., "Navigating the Social Terrain with Google Latitude," presented at iConference 2010, Feb. 3-6, 2010, Urbana-Chapmpaign, Illinois, pre-conference paper found at <http://citeseerx.ist.psu.edu/viewdoc/download?doi=10.1.1.158.6512&rep=rep1&type=pdf>, 5 pages.

Bales, Elizabeth, "Noncommand Interfaces for Communication Technology in Mobile Settings," retrieved on Oct. 25, 2010 at <http://cseweb.ucsd.edu/users/earrowsm/bales.pdf>, 12 pages.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

"Plazes—Right Plaze, Right Time," at <http://plazes.com>, copyright 2004-2011, Plazes AG, printed May 3, 2011, 2 pages.

(56) References Cited

OTHER PUBLICATIONS

Miller, B. N. et al., "PocketLens: Toward a Personal Recommender System," ACM Transactions on Information Systems, vol. 22, No. 3, Jul. 2004, pp. 437-476, 40 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 555âA60, 6 pages.

Kincaid, Jason, "Quub: A Micromessaging Service That Asks 'What are you doing?' and Means It," TechCrunch, Apr. 27, 2009, at <http://techcrunch.com/2009/04/27/guub-a-micromessaging-service-that-asks-what-are-you-doing-and-means-it/>, 10 pages.

"Resource Description Framework (RDF) / W3C Semantic Web Activity," at <http://www.w3.org/RDF/>, from the Internet Archive dated Jul. 30, 2008, printed Aug. 10, 2012, 6 pages.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Sense Networks—Machine Learning," at <http://www.sensenetworks.com/machine_learning.php>, copyright 2008-2009, Sense Networks, printed Jan. 12, 2009, 2 pages.

"Sense Networks—Technology," at <http://www.sensenetworks.com/technology.php>, copyright 2008-2009, Sense Networks, printed Jan. 12, 2009, 2 pages.

"Sense Networks—The Minimum Volume Embedding Algorithm," at <http://www.sensenetworks.com/mve_algorithm.php>, copyright 2008-2009, Sense Networks, printed Jan. 12, 2009, 2 pages.

Abstract, Rahman, A. et al., "SenseFace: A Sensor Network Overlay for Social Networks," I2MTC 2009, International Instrumentation and Measurement Technology Conference, Singapore, May 5-7, 2009, IEEE, abstract found at <http://ieeexplore.ieee.org/xpl/freeabs_all.jsp?arnumber=5168605>, 1 page.

Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.

"Six degrees of separation," at <http://en.wikipedia.org/wiki/Six_degrees_of_separation>, last modified on Apr. 19, 2011,printed Apr. 28, 2011, 11 pages.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Page, X. And Kobsa, A., "The Circles of Latitude: Adoption and Usage of Location Tracking in Online Social Networking," in IEEE International Conference on Computational Science and Engineering, Aug. 29-31, 2009, Vancouver, Canada, vol. 4, pp. 1027-1030, found at <http://www.computer.org/portal/web/csdl/doi?doc=doi/10.1109/CSE.2009.195>, 4 pages.

Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.

Smale, S. And Greenberg, S., "Transient Life: Collecting and sharing personal information," in OZCHI 2006, Nov. 20-24, 2006, Sydney, Australia, found at <http://grouplab.cpsc.ucalgary.ca/grouplab/uploads/Publications/Publications/2006-TransientLife.OZCHI.pdf>, 14 pages.

"Twibes," at <http://blog.twibes.com/twitter-tools/what-is-a-twibe>, dated Jul. 9, 2009, copyright 2009, Twibes.com, printed Nov. 14, 2012, 3 pages.

Lenhart, A. and Fox, S., "Twitter and status updating," Pew Internet, Feb. 12, 2009, at <http://fortysouth.com/wp-content/uploads/2009/05/Twitter-and-status-updating.pdf>, 11 pages.

"Twitter Groups," at <http://twittgroups.com/index.php>, from the Internet Archive dated Jan. 5, 2010; copyright 2008, twittgroups.com, printed Nov. 14, 2012; 3 pages.

"Twittermap.tv," at <http://twittermap.tv/cms/k19.What-is-this.htm>, from the Internet Archive dated Jan. 27, 2010, copyright 2009, Oliver heeger / kado media, printed Nov. 14, 2012, 1 page.

"Twittervision Uses Google Earth to Track Updates Around the Globe," posted by Eric on Mar. 14, 2010, at <http://alltwitterapps.com/2010/03/14/twittervision-uses-google-earth-to-track-updatesaround-the-globe/>, printed Nov. 14, 2012, 3 pages.

Swedlow, Tracy, "Verizon Launches Twitter, Facebook, Fantasy Sports and Internet Video Widgets for FiOS TV," InteractiveTV Today, Jul. 15, 2009, Retrieved from the internet: http://www.itvt.com/story/5204/verizon-launches-twitter-facebook-fantasy-sports-and-internet-videowidgets-fios-tv.

"Web Crawler," [online] Wikipedia.org [retrieved on Jan. 1, 2007] Retrieved from the Internet: <URL: http://en.wikipedia.org/wiki/Web_crawling> 5 pages.

"Welcome to Facebook!—Facebook," at <http://www.facebook.com/>, copyright 2008, Facebook, printed Jan. 9, 2008, 1 page.

"What is LinkedIn?," at <http://www.linkedin.com/static?key=what_is_linkedin&trk=hb_what>, copyright 2011, LinkedIn Corporation, printed Apr. 28, 2011, 1 page.

"Yammer : Product," at <https://www.yammer.com/about/product>, from the Internet Archive dated Jan. 6, 2010, copyright 2010, Yammer, printed Nov. 14, 2012, 3 pages.

\* cited by examiner

STATUS UPDATE PROPAGATION BASED ON CROWD OR POI SIMILARITY

RELATED APPLICATIONS

This application claims the benefit of provisional patent application Ser. No. 61/309,903, filed Mar. 3, 2010, the disclosure of which is hereby incorporated herein by reference in its entirety.

FIELD OF THE DISCLOSURE

The present disclosure relates to status updates and more specifically relates to following status updates sent by users in crowds that match a select crowd and/or following status updates sent by users at a Point of Interest (POI) that matches a select POI.

BACKGROUND

Services such as the Twitter® micro-blogging and social networking service and the Yammer® micro-blogging and social networking service provide users the ability to easily provide status updates (e.g., answer a simple question such as "what are you doing right now?" or "what are you working on right now?"). These services also allow other people to "follow" specific users in which they are interested to thereby receive status updates sent by those users. One issue with these services is that when the follower-followee graph becomes large and sparse, it is very difficult for users to sort the status updates by importance and/or relevance.

The recent release of the Twitter® Geo Application Programming Interface (API), which allows status updates to be tagged with the latitude/longitude from which the status updates were sent, creates an opportunity to view, search, and organize status updates via location. However, viewing status updates by location, for example within a set of map boundaries, still suffers from not being able to effectively organize all of the potentially relevant status updates available to the user. A map-based status update query will generally show too many irrelevant status updates within the map boundary and no status updates sent from locations beyond the map boundary regardless of their relevance. As such, there is a need for a system and method that enables users to obtain relevant status updates.

SUMMARY

The present disclosure provides systems and methods for following status updates of users. In one embodiment, a requestor selects a crowd of users. In response, one or more crowds of users that match the selected crowd of users to at least a predefined threshold degree are identified. Status updates sent by users in at least one of the one or more matching crowds of users are then delivered to the requestor. In another embodiment, a requestor selects a Point of Interest (POI). In response, one or more POIs that match the selected POI to at least a predefined threshold degree are identified. Status updates sent by users located at one or more POIs of the one or more matching POIs are delivered to the requestor. In one embodiment, the status updates sent by the users at the one or more POIs and delivered to the requestor are status updates sent by users in one or more crowds of users located at the one or more POIs.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
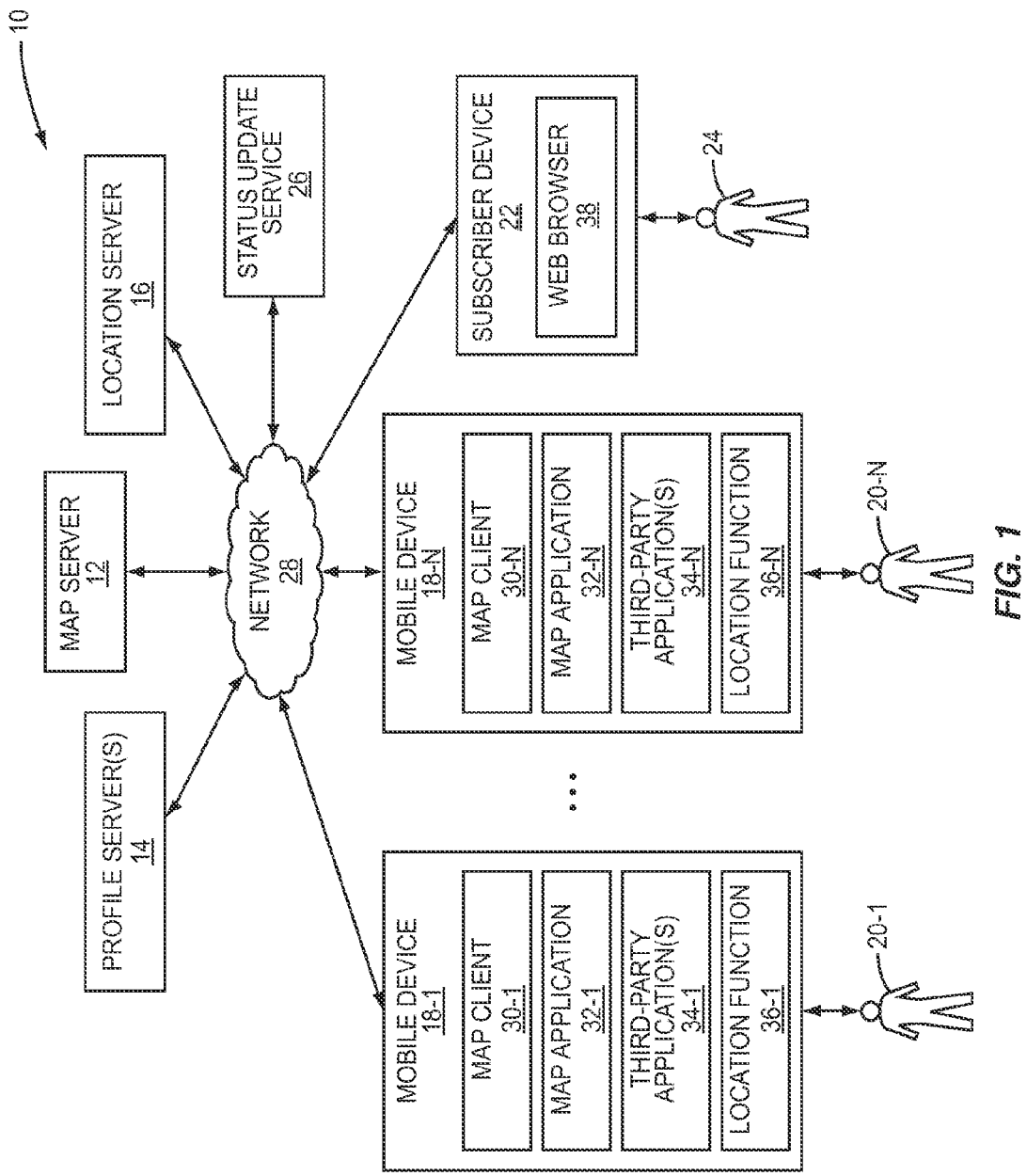
FIG. 1 illustrates a Mobile Aggregate Profile (MAP) system according to one embodiment of the present disclosure.
Figure 6:
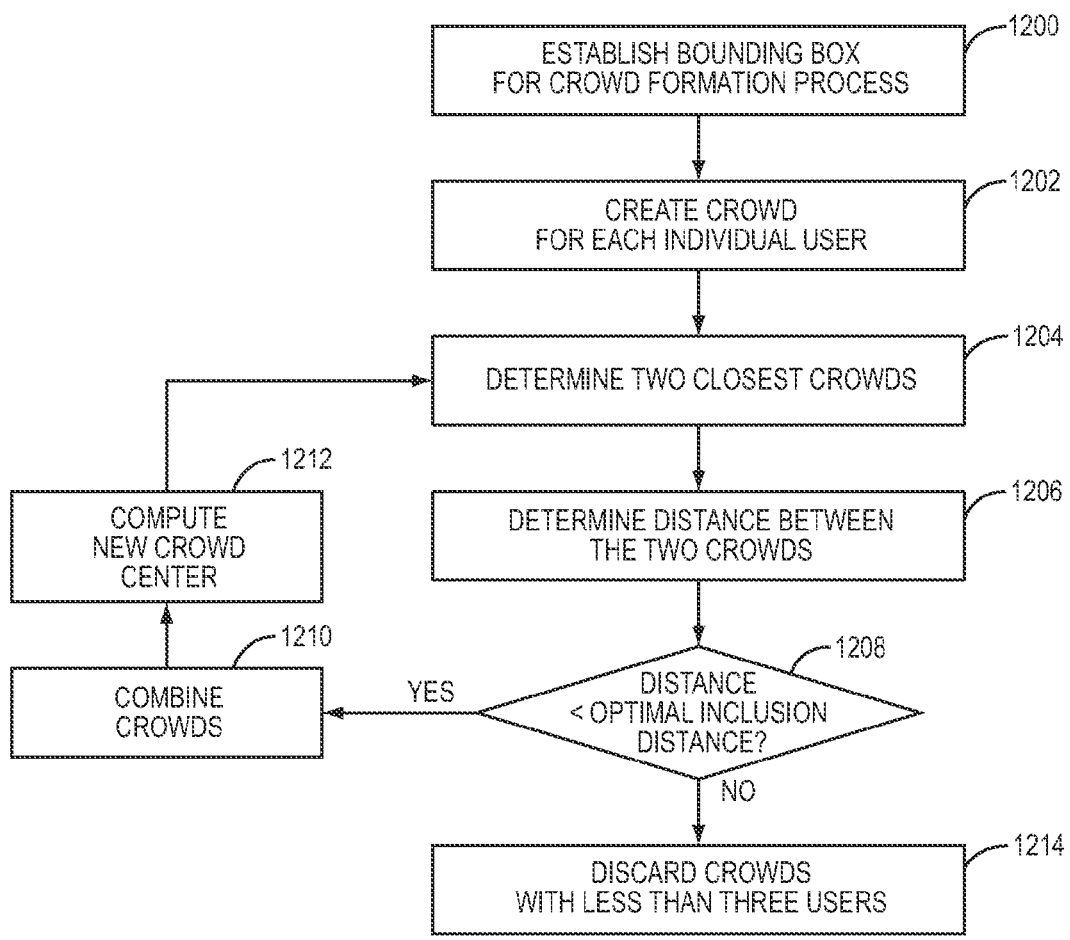
FIG. 6 is a flow chart for a spatial crowd formation process according to one embodiment of the present disclosure.
Figure 12:
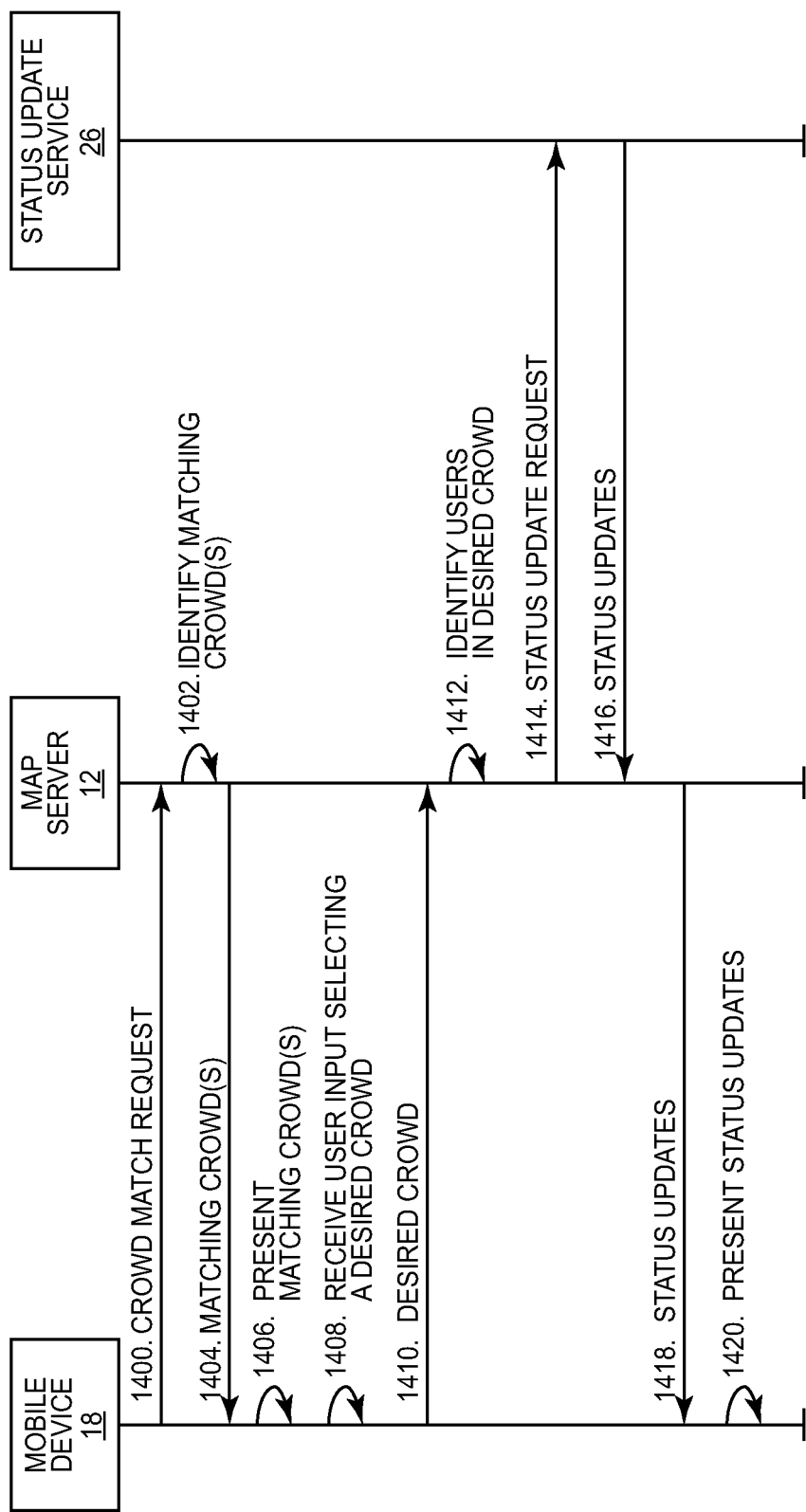
Figure 13A:
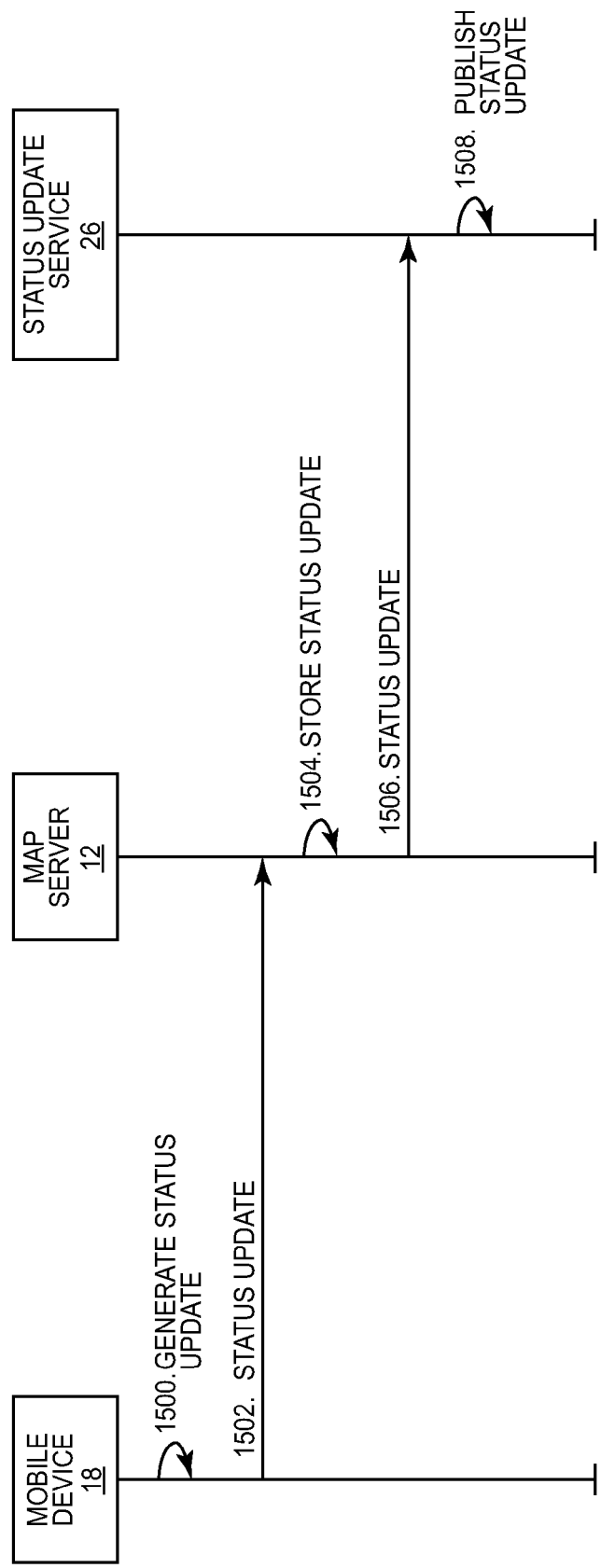
Figure 13B:
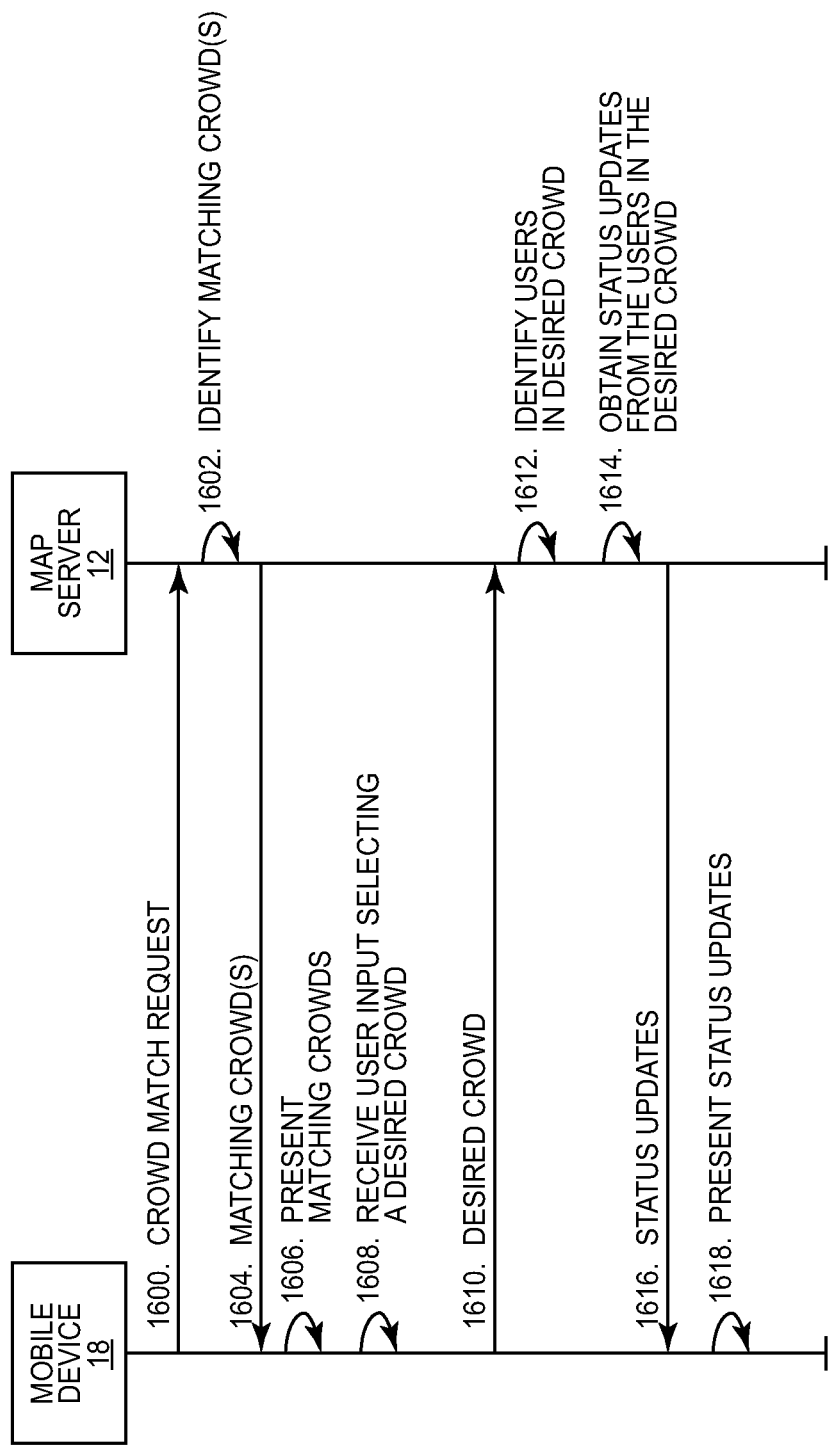
Figure 14:
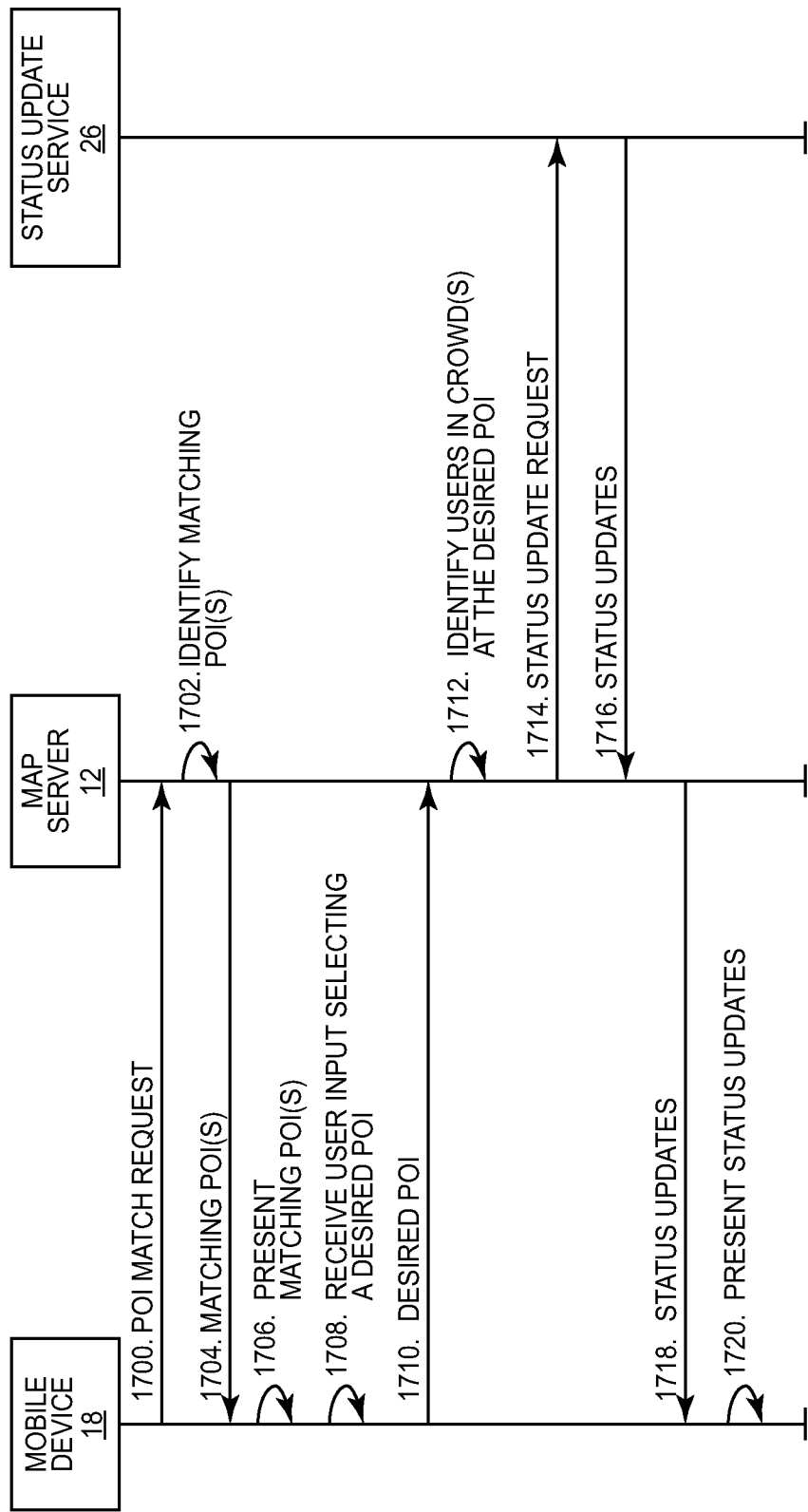
Figure 15A:
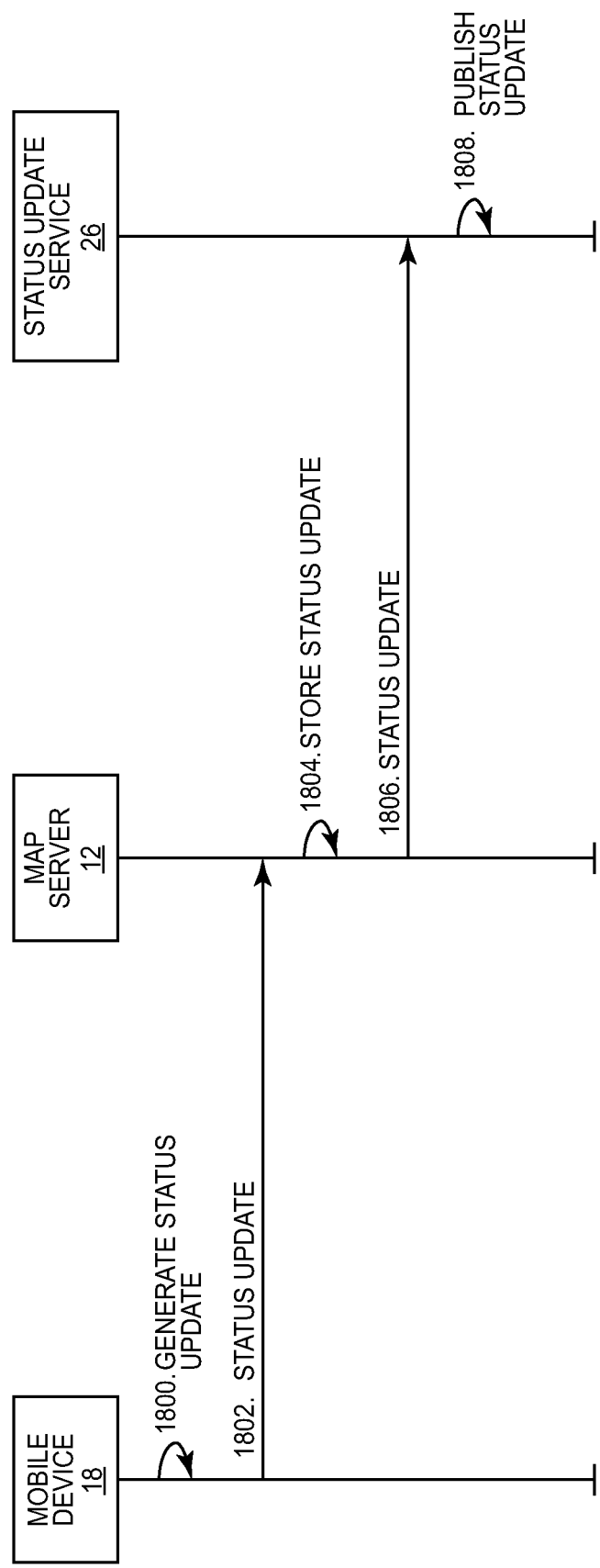
Figure 15B:
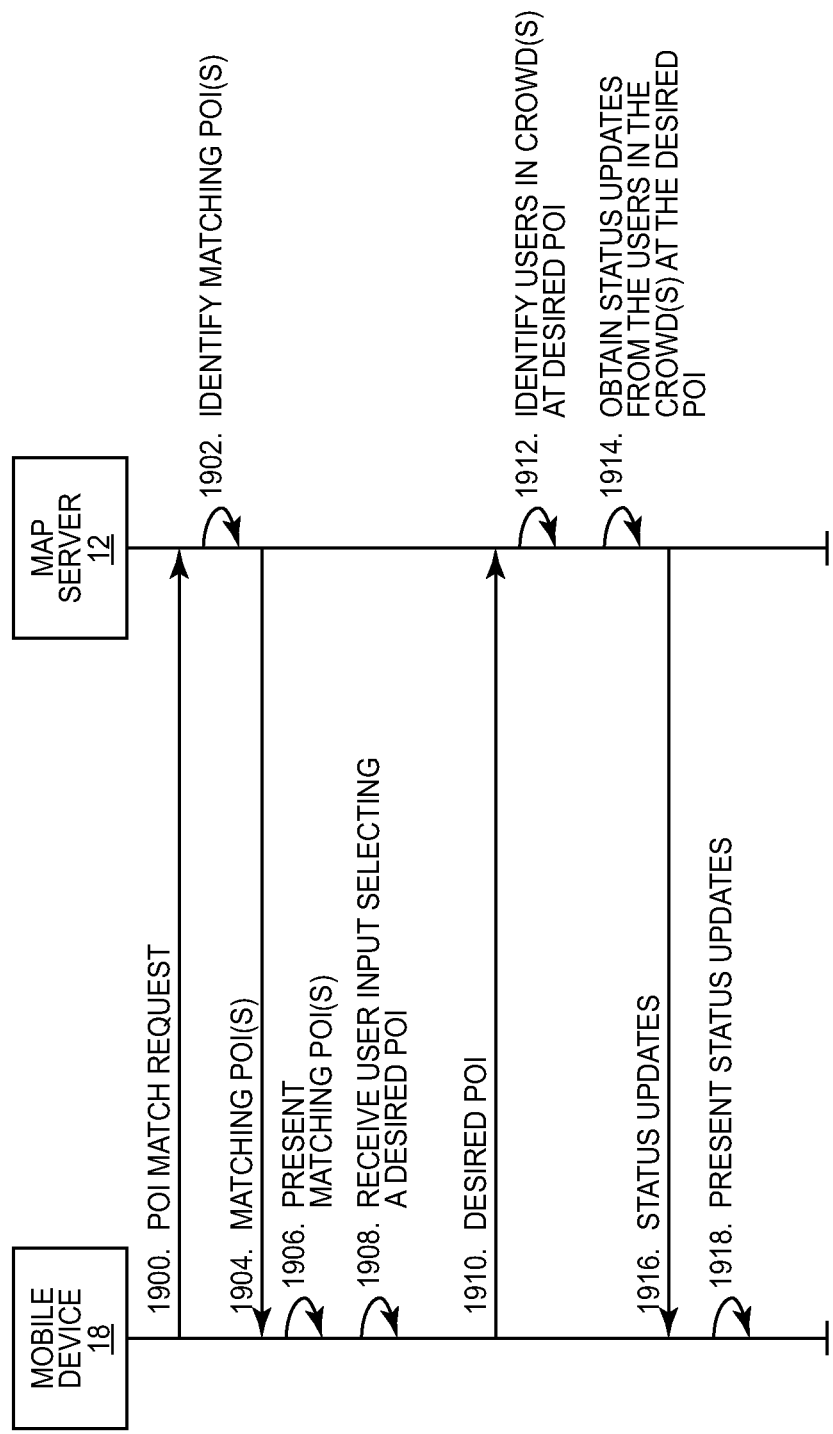
Figure 16:
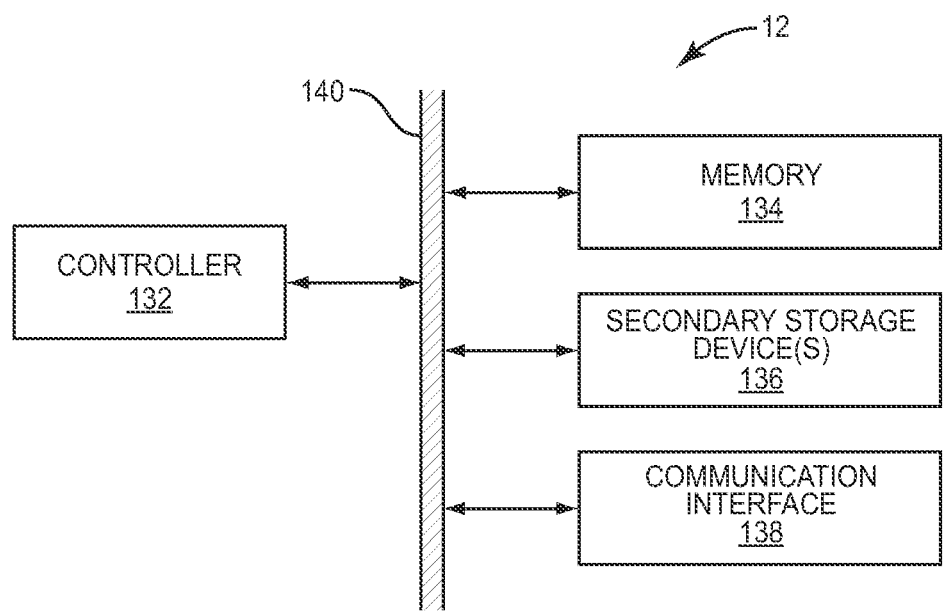
Figure 17:
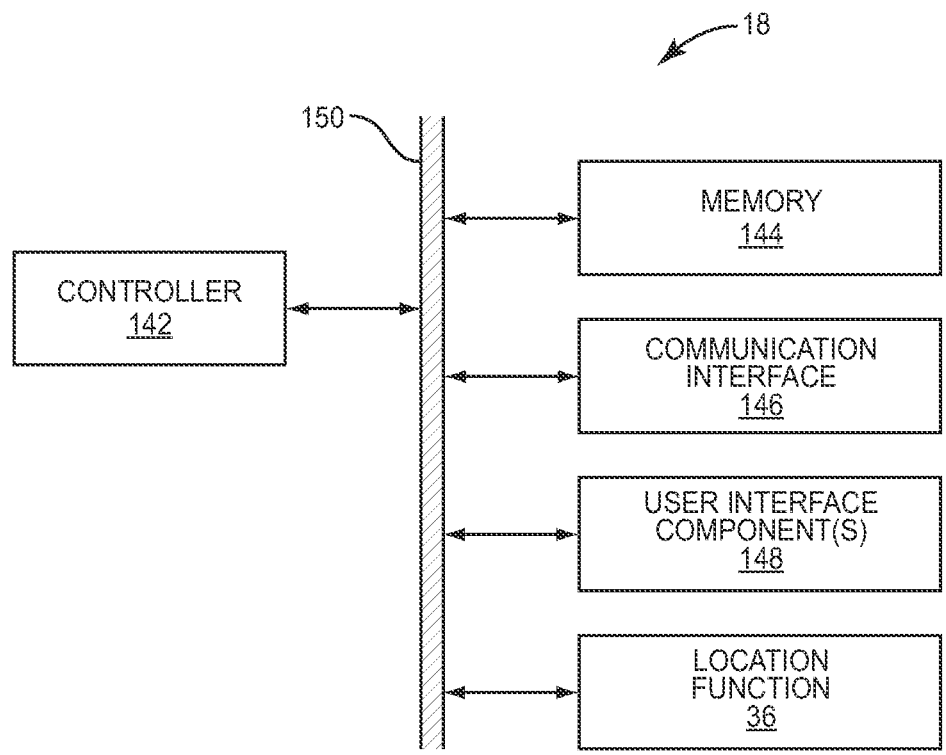
Figure 18:
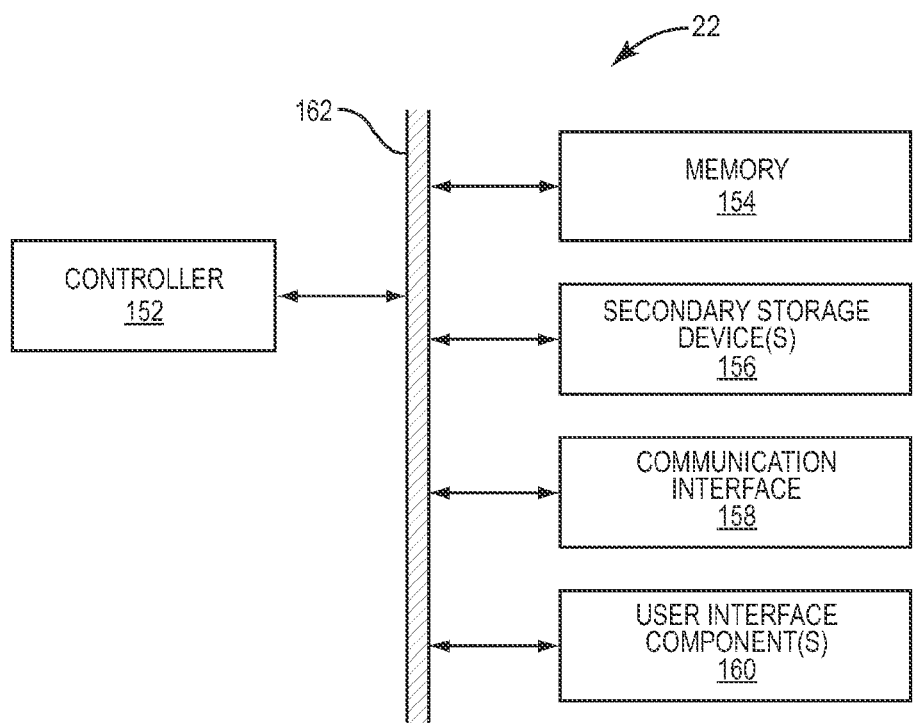
Figure 19:
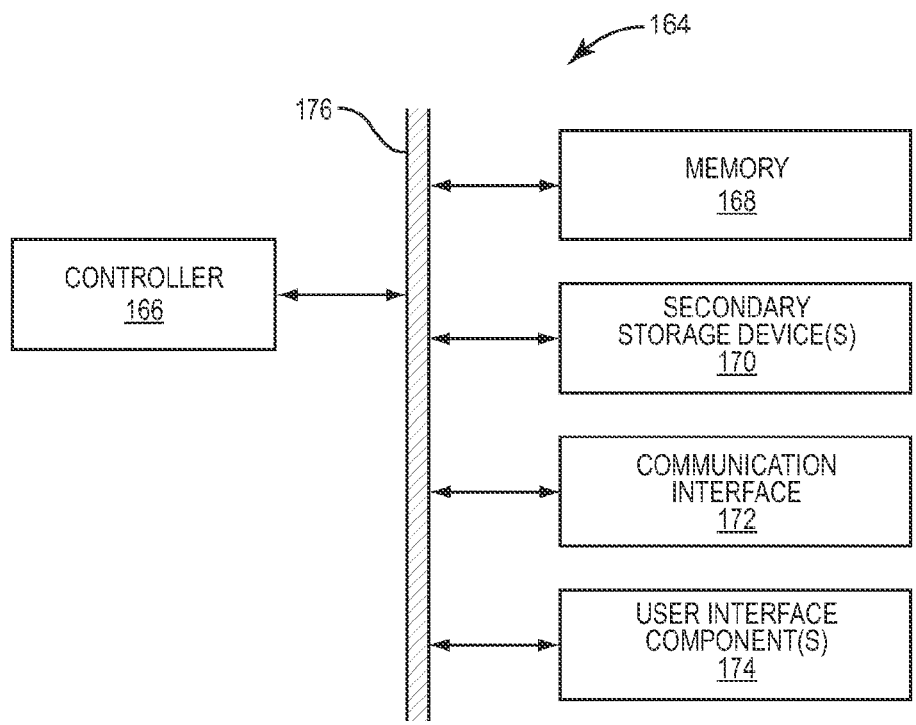

FIGS. 7A through 7D graphically illustrate the crowd formation process of FIG. 6 for an exemplary bounding box;

FIGS. 8A through 8D illustrate a flow chart for a spatial crowd formation process according to another embodiment of the present disclosure;

FIGS. 9A through 9D graphically illustrate the crowd formation process of FIGS. 8A through 8D for a scenario where the crowd formation process is triggered by a location update for a user having no old location;

FIGS. 10A through 10F graphically illustrate the crowd formation process of FIGS. 8A through 8D for a scenario where the new and old bounding boxes overlap;

FIGS. 11A through 11E graphically illustrate the crowd formation process of FIGS. 8A through 8D in a scenario where the new and old bounding boxes do not overlap;

FIG. 12 illustrates the operation of the system of FIG. 1 to enable a requestor to follow status updates from users in a crowd that matches a select crowd according to one embodiment of the present disclosure;

FIGS. 13A and 13B illustrate the operation of the system of FIG. 1 to enable a requestor to follow status updates from users in a crowd that matches a select crowd according to another embodiment of the present disclosure;

FIG. 14 illustrates the operation of the system of FIG. 1 to enable a requestor to follow status updates from users at a Point of Interest (POI) that matches a select POI according to one embodiment of the present disclosure;

FIGS. 15A and 15B illustrate the operation of the system of FIG. 1 to enable a requestor to follow status updates from users at a POI that matches a select POI according to another embodiment of the present disclosure;

FIG. 16 is a block diagram of the MAP server of FIG. 1 according to one embodiment of the present disclosure;

FIG. 17 is a block diagram of one of the mobile devices of FIG. 1 according to one embodiment of the present disclosure;

FIG. 18 is a block diagram of the subscriber device of FIG. 1 according to one embodiment of the present disclosure; and FIG. 19 is a block diagram of a server computer hosting the status update service of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a Mobile Aggregate Profile (MAP) system 10 (hereinafter "system 10") that enables a requestor to follow status updates from a crowd of users or from users at a Point of Interest (POI) according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a status update service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., WiFi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations, including location updates, and user profiles of the users 20 of the mobile devices 18. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20, the MAP server 12 is enabled to provide a number of features such as, but not limited to, forming crowds of users using current locations and/or user profiles of the users 20, generating aggregate profiles for crowds of users, and tracking crowds. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s FireEagle service.

The mobile devices 18 may be mobile smart phones, portable media player devices, mobile gaming devices, or the like. Some exemplary mobile devices that may be programmed or otherwise configured to operate as the mobile devices 18 are the Apple® iPhone®, the Palm Pre®, the Samsung Rogue™, the Blackberry Storm™, the Motorola Droid or similar phone running Google's Android™ Operating System, an Apple® iPad®, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate requests for crowd data from the MAP server 12 and present corresponding crowd data returned by the MAP server 12 to the user 20 as well as enable the user 20 to follow status updates sent by users in desired crowds and/or status updates sent by users at desired POIs. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of POIs or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be, or include, a Global Positioning System (GPS) receiver. In addition or alternatively, the location function 36 may include hardware and/or software that enables improved location tracking in indoor environments such as, for example, shopping malls. For example, the location function 36 may be part of, or compatible with, the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the status update service 26 is a service that enables the users 20 to send and receive status updates. As used herein, a status update is a message provided by a user for publication via a status update, or micro-blogging, service such as, for example, the Twitter® micro-blogging and social networking service or the Facebook® social networking service. The status update may include a text-based status update, an audio status update, a video status update, an image status update, or any combination thereof. As an example, a status update may be a tweet provided by a user of the Twitter® micro-blogging and social networking service or a post made by a user of the Facebook® social networking service, which are two exemplary status update services. As discussed below in detail, requestors (e.g., the users 20 or the subscriber 24) are enabled to follow status updates from the users 20 in desired crowds of users and/or follow status updates from the users 20 at desired POIs or the users 20 in crowds of users at desired POIs.

Before proceeding, it should be noted that while the system 10 of FIG. 1 illustrates an embodiment where the one or more profile servers 14, the location server 16, and the status update service 26 are separate from the MAP server 12, the present disclosure is not limited thereto. In an alternative embodiment, the functionality of the one or more profile servers 14, the location server 16, and/or the status update service 26 may be implemented within the MAP server 12. Further, while the profile servers 14, the location server 16, and the status update service 26 are separate in the embodiment of FIG. 1, in another embodiment, the functionality of the profile servers 14, the location server 16, and/or the status update service 26 may be implemented in a single service.

Figure 2:
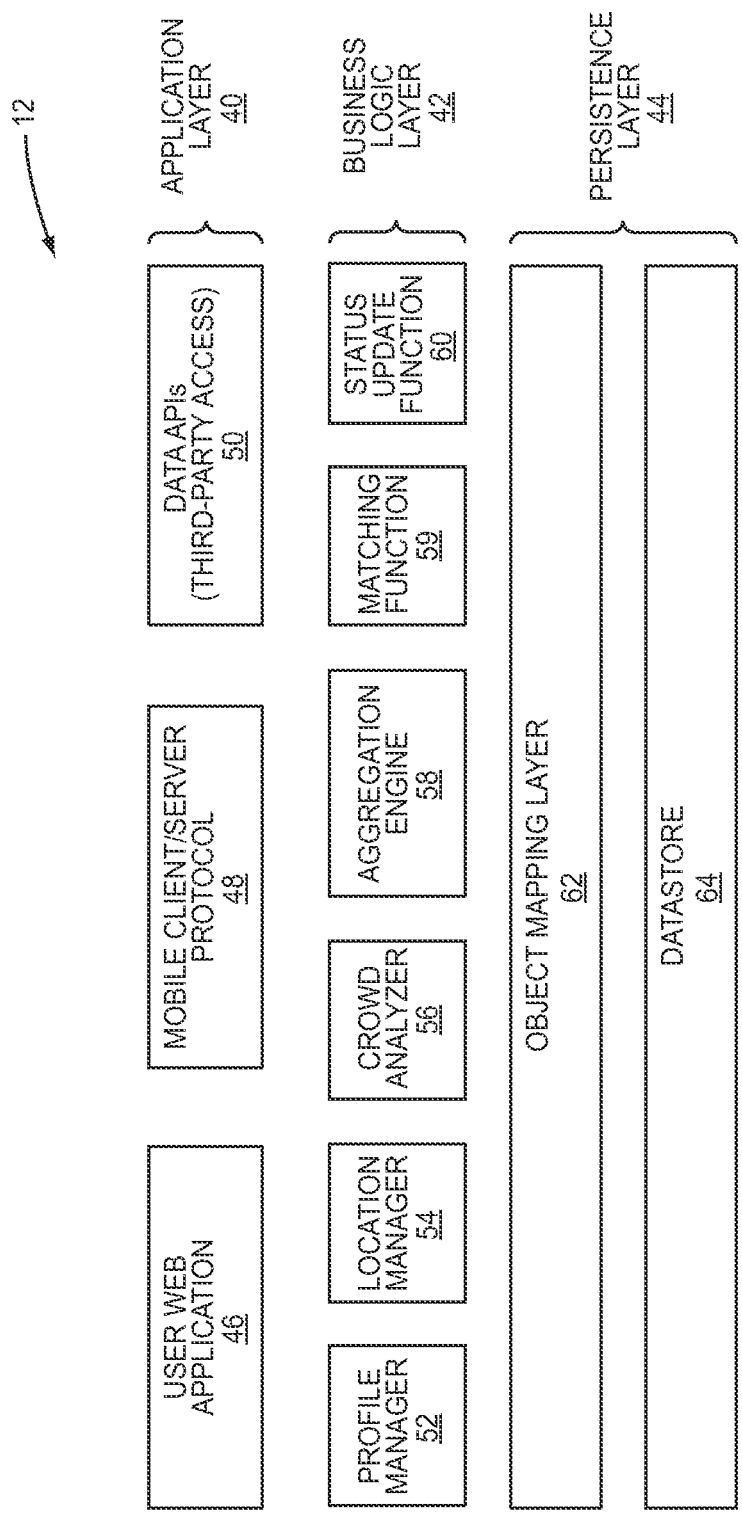
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the status update service 26, to access the MAP server 12.

The business logic layer 42 includes a profile manager 52, a location manager 54, a crowd analyzer 56, an aggregation engine 58, a matching function 59, and a status update function 60 each of which is preferably implemented in software. The profile manager 52 generally operates to obtain the user profiles of the users 20 directly or indirectly from the one or more profile servers 14 and store the user profiles in the persistence layer 44. The location manager 54 operates to obtain the current locations of the users 20 including location updates. As discussed below, the current locations of the users 20 may be obtained directly from the mobile devices 18 and/or obtained from the location server 16.

The crowd analyzer 56 operates to form crowds of users. In one embodiment, the crowd analyzer 56 utilizes a spatial crowd formation algorithm. However, the present disclosure is not limited thereto. In addition, the crowd analyzer 56 may further characterize crowds to reflect degree of fragmentation, best-case and worst-case degree of separation (DOS), and/or degree of bidirectionality. Still further, the crowd analyzer 56 may also operate to track crowds. The aggregation engine 58 generally operates to provide aggregate profile data. The aggregate profile data may be aggregate profile data for crowd(s) of users. For additional information regarding the operation of the profile manager 52, the location manager 54, the crowd analyzer 56, and the aggregation engine 58, the interested reader is directed to U.S. Patent Application Publication No. 2010/0198828, entitled FORMING CROWDS AND PROVIDING ACCESS TO CROWD DATA IN A MOBILE ENVIRONMENT, which published on Aug. 5, 2010; U.S. Patent Application Publication No. 2010/0197318, entitled ANONYMOUS CROWD TRACKING, which published on Aug. 5, 2010; U.S. Patent Application Publication No. 2010/0198826, entitled MAINTAINING A HISTORICAL RECORD OF ANONYMIZED USER PROFILE DATA BY LOCATION FOR USERS IN A MOBILE ENVIRONMENT, which published on Aug. 5, 2010; U.S. Patent Application Publication No. 2010/0198917, entitled CROWD FORMATION FOR MOBILE DEVICE USERS, which published on Aug. 5, 2010; U.S. Patent Application Publication No. 2010/0198870, entitled SERVING A REQUEST FOR DATA FROM A HISTORICAL RECORD OF ANONYMIZED USER PROFILE DATA IN A MOBILE ENVIRONMENT, which published on Aug. 5, 2010; U.S. Patent Application Publication No. 2010/0198862, entitled HANDLING CROWD REQUESTS FOR LARGE GEOGRAPHIC AREAS, which published on Aug. 5, 2010; and U.S. Patent Application Publication No. 2010/0197319, entitled MODIFYING A USER'S CONTRIBUTION TO AN AGGREGATE PROFILE BASED ON TIME BETWEEN LOCATION UPDATES AND EXTERNAL EVENTS, which published on Aug. 5, 2010; all of which have been incorporated herein by reference in their entireties.

As discussed below in detail, the matching function 59 and the status update function 60 enable requestors, such as but not limited to the users 20 and the subscriber 24, to follow status updates from users in desired crowds of users and/or follow status updates from users at desired POIs. In general, in one embodiment, one or more crowds that match a select crowd of users are identified on behalf of a requestor. Status updates sent by users in one or more of these matching crowds are obtained and returned to the requestor. In another embodiment, one or more POIs that match a select POI are identified on behalf of a requestor. Status updates sent by users at one or more of these matching POIs are obtained and returned to the requestor. The status updates from users at one or more of the matching POIs may be status updates from users in one or more crowds of users located at the one or more matching POIs. Alternatively, the status updates from users at one or more of the matching POIs may be status updates from any users at the one or more matching POIs.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
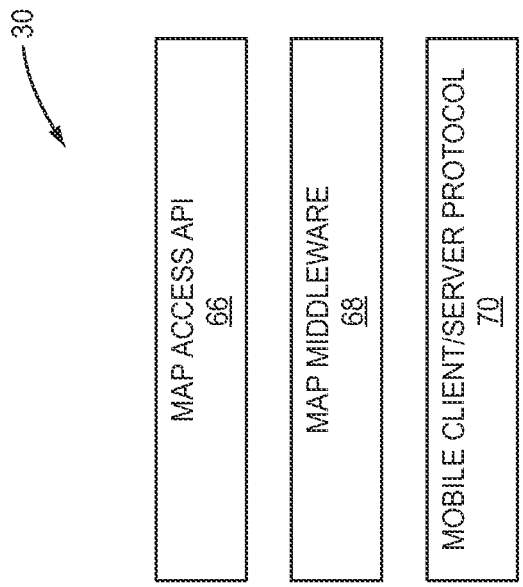
FIG. 3 is a block diagram of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP application 32 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
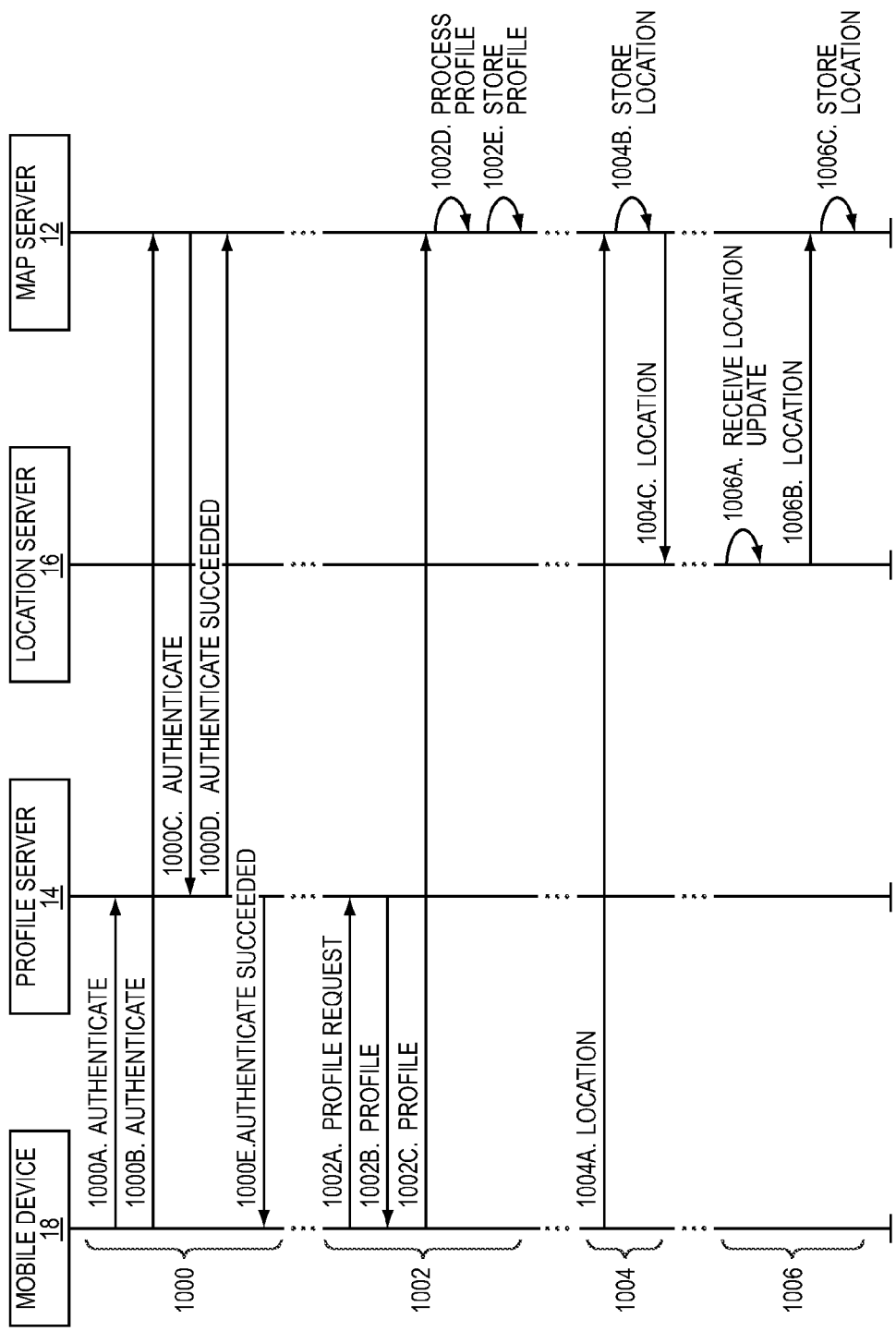
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12 that operate to map the user profiles of the users 20 obtained from the social network services to a common format utilized by the MAP server 12. This common format includes a number of user profile categories, or user profile slices, such as, for example, a demographic profile category, a social interaction profile category, a general interests category, a music interests profile category, and a movie interests profile category. For example, if the MAP server 12 supports user profiles from Facebook®, MySpace®, and LinkedIN®, the profile manager 52 may include a Facebook handler, a MySpace handler, and a LinkedIN handler. The social network handlers process user profiles from the corresponding social network services to generate user profiles for the users 20 in the common format used by the MAP server 12. For this example assume that the user profile of the user 20 is from Facebook®. The profile manager 52 uses a Facebook handler to process the user profile of the user 20 to map the user profile of the user 20 from Facebook® to a user profile for the user 20 for the MAP server 12 that includes lists of keywords for a number of predefined profile categories, or profile slices, such as, for example, a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. Any historical data maintained by the MAP server 12 is preferably anonymized in order to maintain the privacy of the users 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
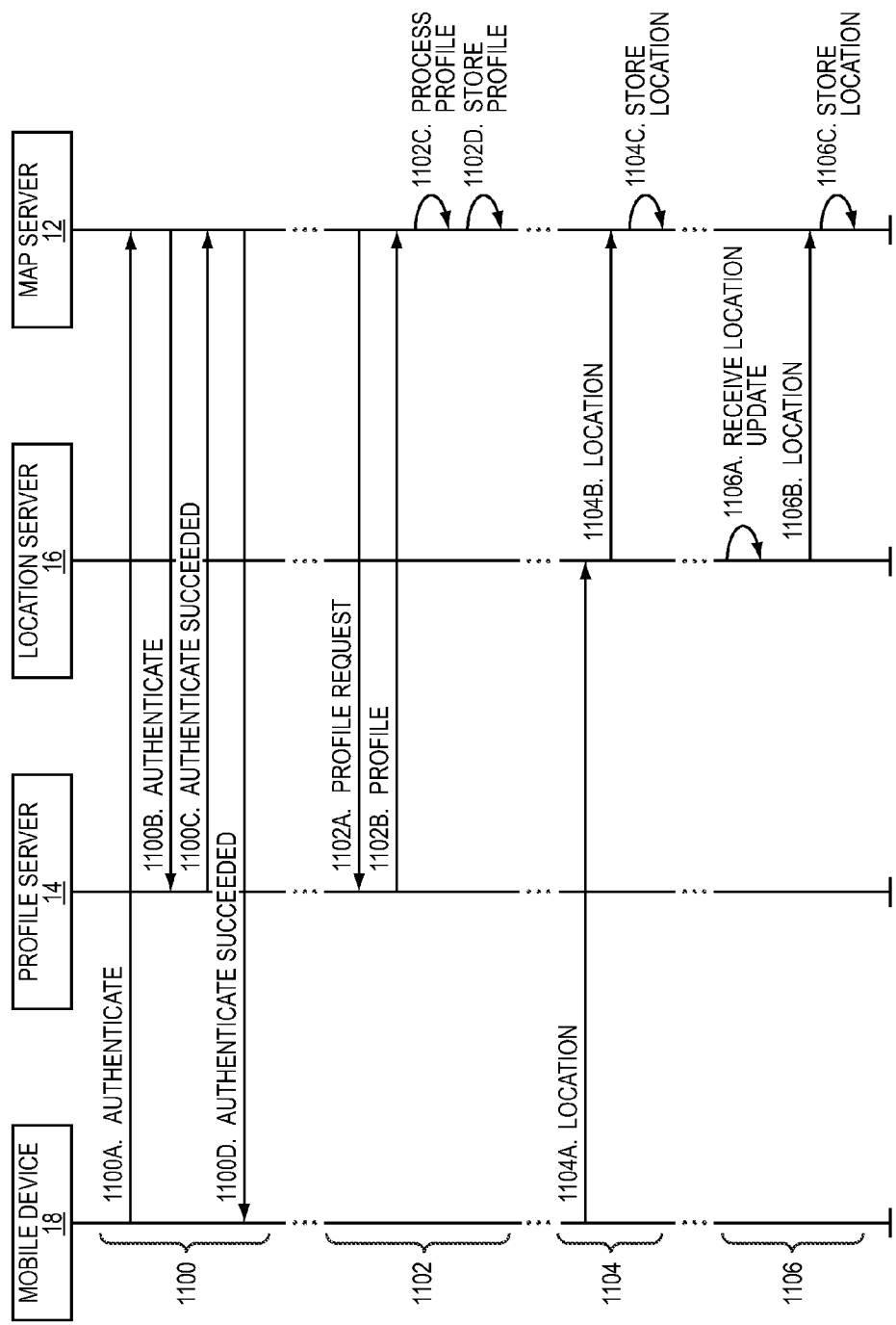
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories, or profile slices.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

FIG. 6 begins a discussion of the operation of the crowd analyzer 56 to form crowds of users according to one embodiment of the present disclosure. Specifically, FIG. 6 is a flow chart for a spatial crowd formation process according to one embodiment of the present disclosure. Note that, in one embodiment, this process is performed in response to a request for crowd data for a POI or an AOI or in response to a crowd search request. In another embodiment, this process may be performed proactively by the crowd analyzer 56 as, for example, a background process.

First, the crowd analyzer 56 establishes a bounding box for the crowd formation process (step 1200). Note that while a bounding box is used in this example, other geographic shapes may be used to define a bounding region for the crowd formation process (e.g., a bounding circle). In one embodiment, if crowd formation is performed in response to a specific request, the bounding box is established based on the POI or the AOI of the request. If the request is for a POI, then the bounding box is a geographic area of a predetermined size centered at the POI. If the request is for an AOI, the bounding box is the AOI. Alternatively, if the crowd formation process is performed proactively, the bounding box is a bounding box of a predefined size.

The crowd analyzer 56 then creates a crowd for each individual user in the bounding box (step 1202). More specifically, the crowd analyzer 56 queries the datastore 64 of the MAP server 12 to identify users currently located within the bounding box. Then, a crowd of one user is created for each user currently located within the bounding box. Next, the crowd analyzer 56 determines the two closest crowds in the bounding box (step 1204) and determines a distance between the two crowds (step 1206). The distance between the two crowds is a distance between crowd centers of the two crowds. Note that the crowd center of a crowd of one is the current location of the user in the crowd. The crowd analyzer 56 then determines whether the distance between the two crowds is less than an optimal inclusion distance (step 1208). In this embodiment, the optimal inclusion distance is a predefined static distance. If the distance between the two crowds is less than the optimal inclusion distance, the crowd analyzer 56 combines the two crowds (step 1210) and computes a new crowd center for the resulting crowd (step 1212). The crowd center may be computed based on the current locations of the users in the crowd using a center of mass algorithm. At this point the process returns to step 1204 and is repeated until the distance between the two closest crowds is not less than the optimal inclusion distance. At that point, the crowd analyzer 56 discards any crowds with less than three users (step 1214). Note that throughout this disclosure crowds are only maintained if the crowds include three or more users. However, while three users is the preferred minimum number of users in a crowd, the present disclosure is not limited thereto. The minimum number of users in a crowd may be defined as any number greater than or equal to two users.

Figure 7A:
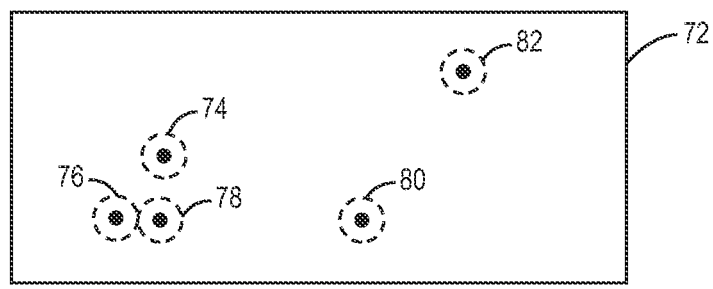
Figure 7B:
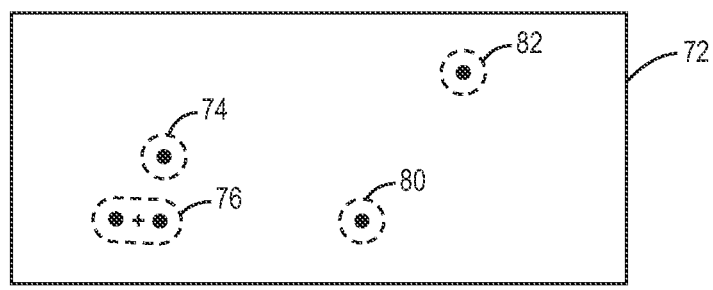
Figure 7C:
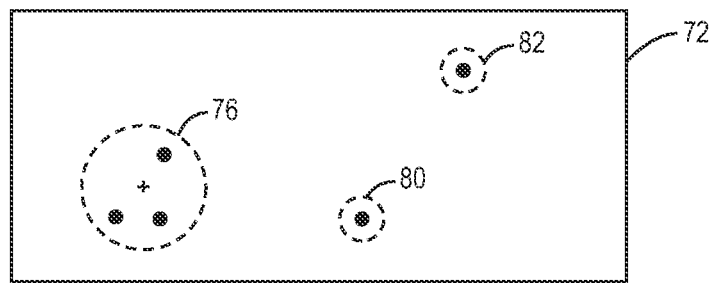
Figure 7D:
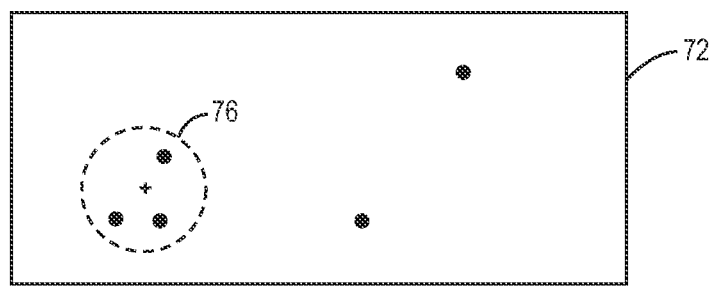

FIGS. 7A through 7D graphically illustrate the crowd formation process of FIG. 6 for an exemplary bounding box 72. In FIGS. 7A through 7D, crowds are noted by dashed circles, and the crowd centers are noted by cross-hairs (+). As illustrated in FIG. 7A, initially, the crowd analyzer 56 creates crowds 74 through 82 for the users in the geographic area defined by the bounding box 72, where, at this point, each of the crowds 74 through 82 includes one user. The current locations of the users are the crowd centers of the crowds 74 through 82. Next, the crowd analyzer 56 determines the two closest crowds and a distance between the two closest crowds. In this example, at this point, the two closest crowds are crowds 76 and 78, and the distance between the two closest crowds 76 and 78 is less than the optimal inclusion distance. As such, the two closest crowds 76 and 78 are combined by merging crowd 78 into crowd 76, and a new crowd center (+) is computed for the crowd 76, as illustrated in FIG. 7B. Next, the crowd analyzer 56 again determines the two closest crowds, which are now crowds 74 and 76. The crowd analyzer 56 then determines a distance between the crowds 74 and 76. Since the distance is less than the optimal inclusion distance, the crowd analyzer 56 combines the two crowds 74 and 76 by merging the crowd 74 into the crowd 76, and a new crowd center (+) is computed for the crowd 76, as illustrated in FIG. 7C. At this point, there are no more crowds separated by less than the optimal inclusion distance. As such, the crowd analyzer 56 discards crowds having less than three users, which in this example are crowds 80 and 82. As a result, at the end of the crowd formation process, the crowd 76 has been formed with three users, as illustrated in FIG. 7D.

FIGS. 8A through 8D illustrate a flow chart for a spatial crowd formation process according to another embodiment of the present disclosure. In this embodiment, the spatial crowd formation process is triggered in response to receiving a location update for one of the users 20 and is preferably repeated for each location update received for the users 20. As such, first, the crowd analyzer 56 receives a location update, or a new location, for one of the users 20 (step 1300). In response, the crowd analyzer 56 retrieves an old location of the user 20, if any (step 1302). The old location is the current location of the user 20 prior to receiving the new location. The crowd analyzer 56 then creates a new bounding box of a predetermined size centered at the new location of the user 20 (step 1304) and an old bounding box of a predetermined size centered at the old location of the user 20, if any (step 1306). The predetermined size of the new and old bounding boxes may be any desired size. As one example, the predetermined size of the new and old bounding boxes is 40 meters by 40 meters. Note that if the user 20 does not have an old location (i.e., the location received in step 1300 is the first location received for the user 20), then the old bounding box is essentially null. Also note that while bounding "boxes" are used in this example, the bounding areas may be of any desired shape.

Next, the crowd analyzer 56 determines whether the new and old bounding boxes overlap (step 1308). If so, the crowd analyzer 56 creates a bounding box encompassing the new and old bounding boxes (step 1310). For example, if the new and old bounding boxes are 40×40 meter regions and a 1×1 meter square at the northeast corner of the new bounding box overlaps a 1×1 meter square at the southwest corner of the old bounding box, the crowd analyzer 56 may create a 79×79 meter square bounding box encompassing both the new and old bounding boxes.

The crowd analyzer 56 then determines the individual users and crowds relevant to the bounding box created in step 1310 (step 1312). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 56 computes an optimal inclusion distance for individual users based on user density within the bounding box (step 1314). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (1)}$$

where a is a number between 0 and 1, $A_{BoundingBox}$ is an area of the bounding box, and number of users is the total number of users in the bounding box. The total number of users in the bounding box includes both individual users that are not already in a crowd and users that are already in a crowd. In one embodiment, a is ⅔.

The crowd analyzer 56 then creates a crowd for each individual user within the bounding box that is not already included in a crowd and sets the optimal inclusion distance for the crowds to the initial optimal inclusion distance (step 1316). At this point, the process proceeds to FIG. 8B where the crowd analyzer 56 analyzes the crowds relevant to the bounding box to determine whether any of the crowd members (i.e., users in the crowds) violate the optimal inclusion distance of their crowds (step 1318). Any crowd member that violates the optimal inclusion distance of his or her crowd is then removed from that crowd (step 1320). The crowd analyzer 56 then creates a crowd of one user for each of the users removed from their crowds in step 1320 and sets the optimal inclusion distance for the newly created crowds to the initial optimal inclusion distance (step 1322).

Next, the crowd analyzer 56 determines the two closest crowds for the bounding box (step 1324) and a distance between the two closest crowds (step 1326). The distance between the two closest crowds is the distance between the crowd centers of the two closest crowds. The crowd analyzer 56 then determines whether the distance between the two closest crowds is less than the optimal inclusion distance of a larger of the two closest crowds (step 1328). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 56 determines whether the distance between the two closest crowds is less than the optimal inclusion distances of both of the two closest crowds. As another alternative, if the two closest crowds are of the same size, the crowd analyzer 56 may compare the distance between the two closest crowds to an average of the optimal inclusion distances of the two closest crowds.

If the distance between the two closest crowds is not less than the optimal inclusion distance, then the process proceeds to step 1338. Otherwise, the two closest crowds are combined or merged (step 1330), and a new crowd center for the resulting crowd is computed (step 1332). Again, a center of mass algorithm may be used to compute the crowd center of a crowd. In addition, a new optimal inclusion distance for the resulting crowd is computed (step 1334). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (2)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (3)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 56 determines whether a maximum number of iterations have been performed (step 1336). The maximum number of iterations is a predefined number that ensures that the crowd formation process does not indefinitely loop over steps 1318 through 1334 or loop over steps 1318 through 1334 more than a desired maximum number of times. If the maximum number of iterations has not been reached, the process returns to step 1318 and is repeated until either the distance between the two closest crowds is not less than the optimal inclusion distance of the larger crowd or the maximum number of iterations has been reached. At that point, the crowd analyzer 56 discards crowds with less than three users, or members (step 1338) and the process ends.

Figure 8A:
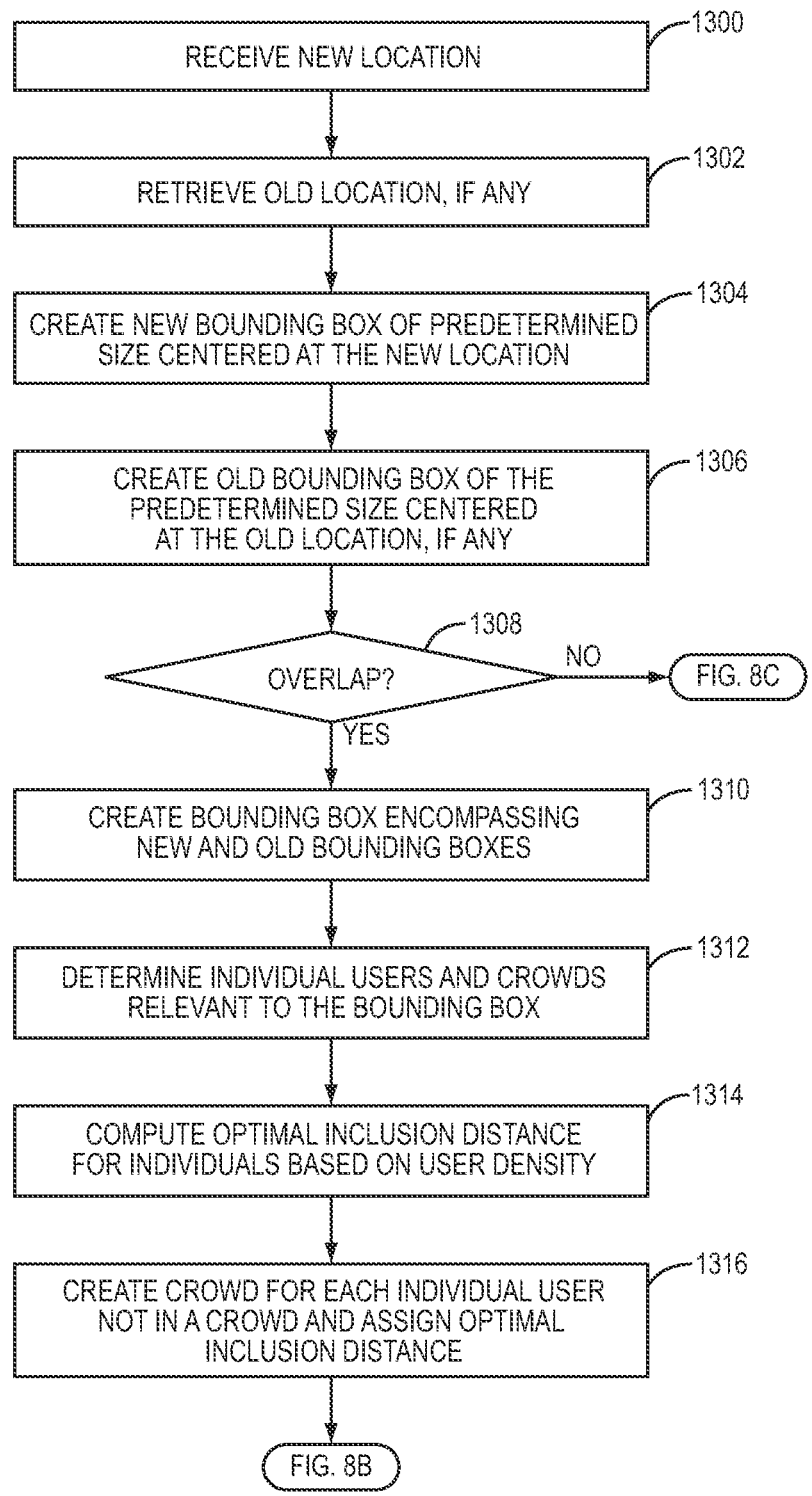
Figure 8B:
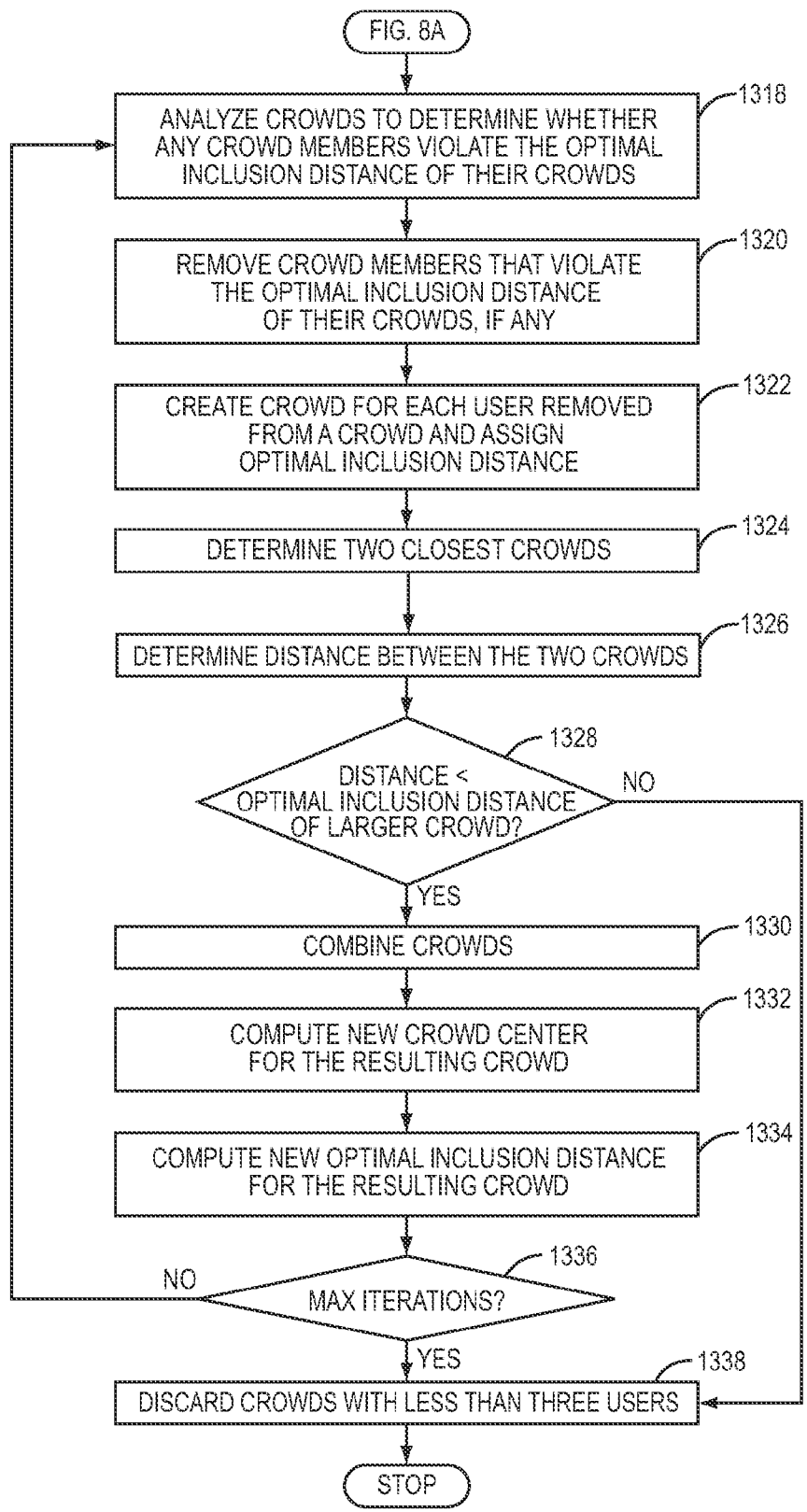
Figure 8C:
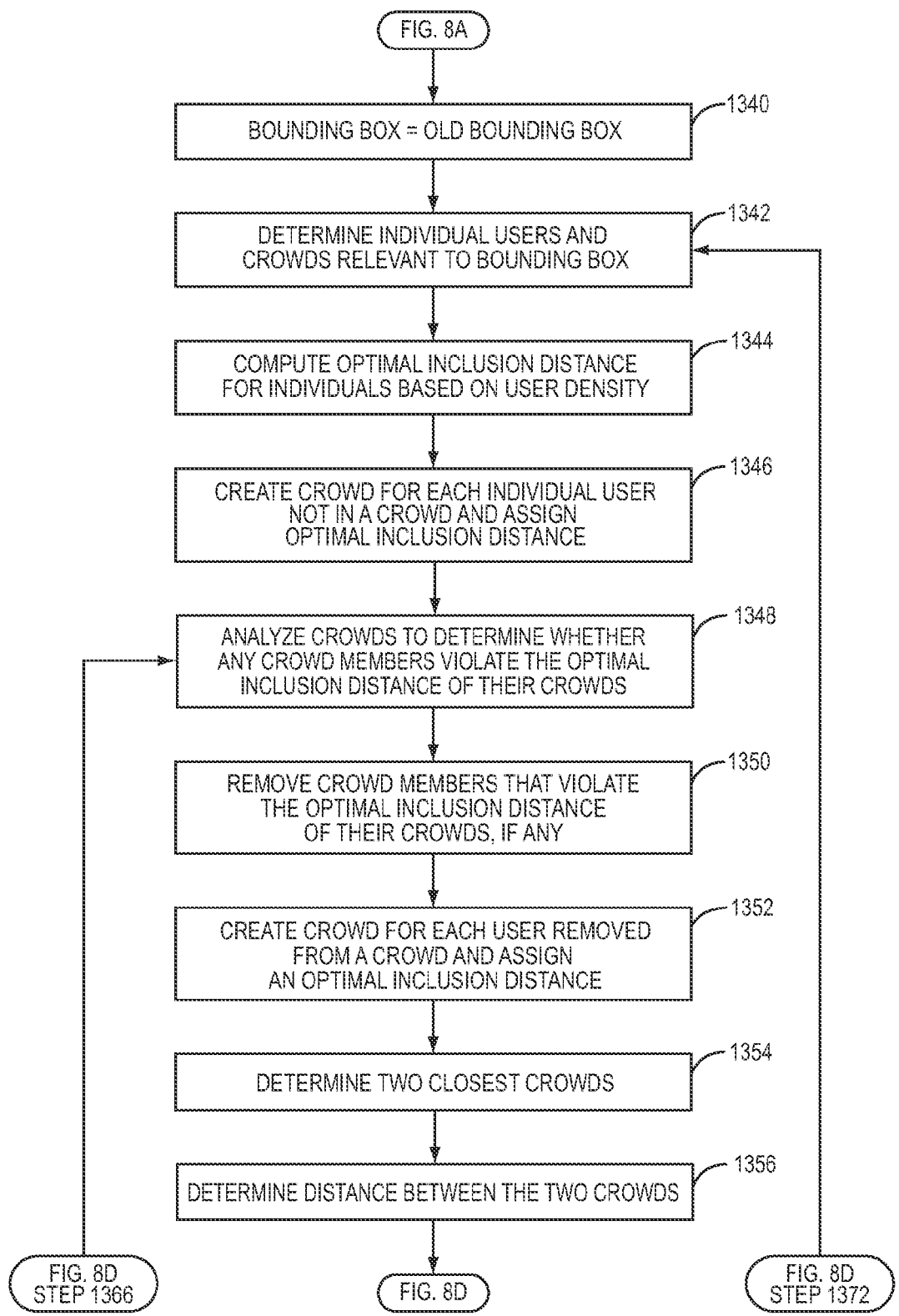
Figure 8D:
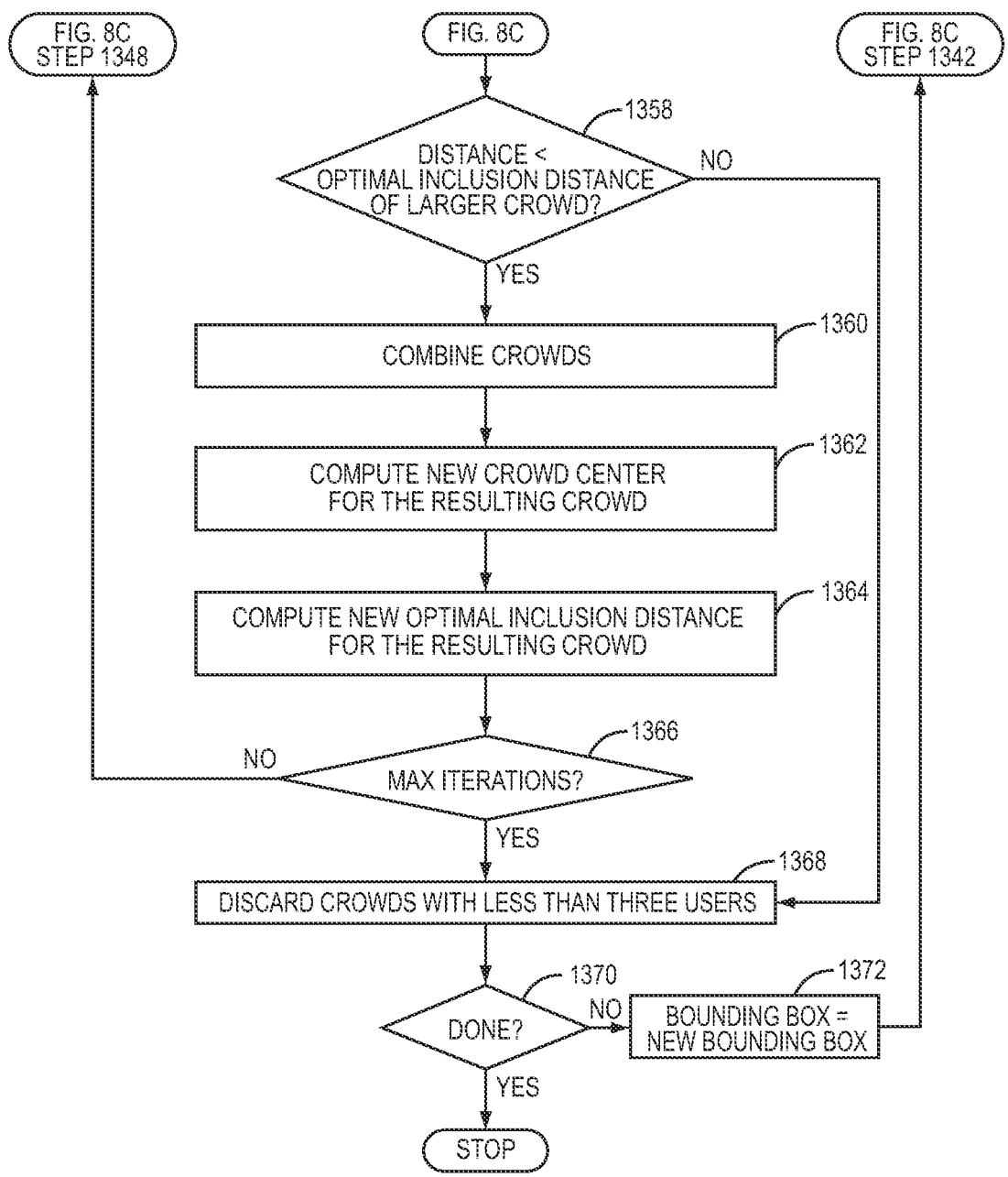

Returning to step 1308 in FIG. 8A, if the new and old bounding boxes do not overlap, the process proceeds to FIG. 8C and the bounding box to be processed is set to the old bounding box (step 1340). In general, the crowd analyzer 56 then processes the old bounding box in much the same manner as described above with respect to steps 1312 through 1338. More specifically, the crowd analyzer 56 determines the individual users and crowds relevant to the bounding box (step 1342). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 56 computes an optimal inclusion distance for individual users based on user density within the bounding box (step 1344). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (4)}$$

where a is a number between 0 and 1, $A_{BoundingBox}$ is an area of the bounding box, and number of users is the total number of users in the bounding box. The total number of users in the bounding box includes both individual users that are not already in a crowd and users that are already in a crowd. In one embodiment, a is ⅔.

The crowd analyzer 56 then creates a crowd of one user for each individual user within the bounding box that is not already included in a crowd and sets the optimal inclusion distance for the crowds to the initial optimal inclusion distance (step 1346). At this point, the crowd analyzer 56 analyzes the crowds for the bounding box to determine whether any crowd members (i.e., users in the crowds) violate the optimal inclusion distance of their crowds (step 1348). Any crowd member that violates the optimal inclusion distance of his or her crowd is then removed from that crowd (step 1350). The crowd analyzer 56 then creates a crowd of one user for each of the users removed from their crowds in step 1350 and sets the optimal inclusion distance for the newly created crowds to the initial optimal inclusion distance (step 1352).

Next, the crowd analyzer 56 determines the two closest crowds in the bounding box (step 1354) and a distance between the two closest crowds (step 1356). The distance between the two closest crowds is the distance between the crowd centers of the two closest crowds. The crowd analyzer 56 then determines whether the distance between the two closest crowds is less than the optimal inclusion distance of a larger of the two closest crowds (step 1358). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 56 determines whether the distance between the two closest crowds is less than the optimal inclusion distances of both of the two closest crowds. As another alternative, if the two closest crowds are of the same size, the crowd analyzer 56 may compare the distance between the two closest crowds to an average of the optimal inclusion distances of the two closest crowds.

If the distance between the two closest crowds is not less than the optimal inclusion distance, the process proceeds to step 1368. Otherwise, the two closest crowds are combined or merged (step 1360), and a new crowd center for the resulting crowd is computed (step 1362). Again, a center of mass algorithm may be used to compute the crowd center of a crowd. In addition, a new optimal inclusion distance for the resulting crowd is computed (step 1364). As discussed above, in one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (5)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (6)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 56 determines whether a maximum number of iterations have been performed (step 1366). If the maximum number of iterations has not been reached, the process returns to step 1348 and is repeated until either the distance between the two closest crowds is not less than the optimal inclusion distance of the larger crowd or the maximum number of iterations has been reached. At that point, the crowd analyzer 56 discards crowds with less than three users, or members (step 1368). The crowd analyzer 56 then determines whether the crowd formation process for the new and old bounding boxes is done (step 1370). In other words, the crowd analyzer 56 determines whether both the new and old bounding boxes have been processed. If not, the bounding box is set to the new bounding box (step 1372), and the process returns to step 1342 and is repeated for the new bounding box. Once both the new and old bounding boxes have been processed, the crowd formation process ends.

Figure 9A:
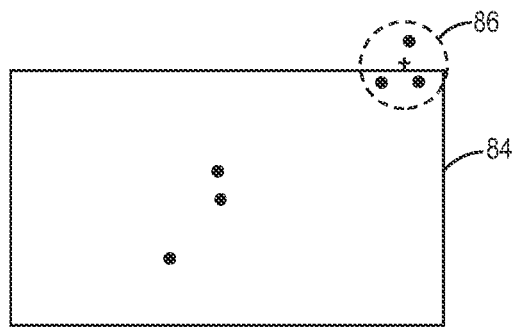
Figure 9B:
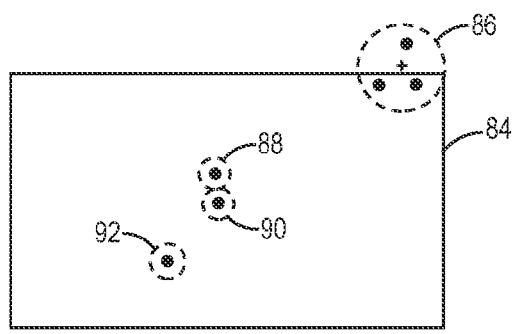

FIGS. 9A through 9D graphically illustrate the crowd formation process of FIGS. 8A through 8D for a scenario where the crowd formation process is triggered by a location update for a user having no old location. In this scenario, the crowd analyzer 56 creates a new bounding box 84 for the new location of the user, and the new bounding box 84 is set as the bounding box to be processed for crowd formation. Then, as illustrated in FIG. 9A, the crowd analyzer 56 identifies all individual users currently located within the new bounding box 84 and all crowds located within or overlapping the new bounding box 84. In this example, crowd 86 is an existing crowd relevant to the new bounding box 84. Crowds are indicated by dashed circles, crowd centers are indicated by cross-hairs (+), and users are indicated as dots. Next, as illustrated in FIG. 9B, the crowd analyzer 56 creates crowds 88 through 92 of one user for the individual users, and the optimal inclusion distances of the crowds 88 through 92 are set to the initial optimal inclusion distance. As discussed above, the initial optimal inclusion distance is computed by the crowd analyzer 56 based on a density of users within the new bounding box 84.

Figure 9C:
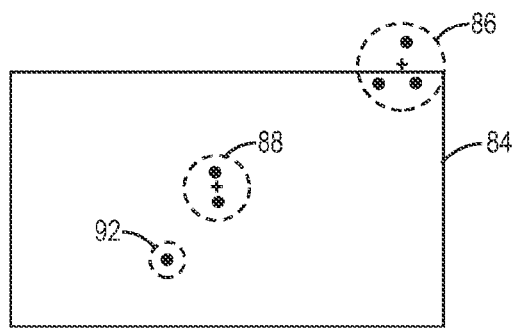
Figure 9D:
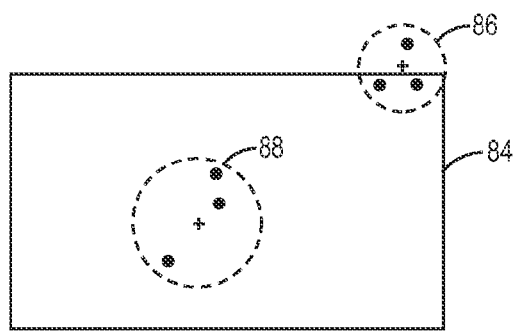

The crowd analyzer 56 then identifies the two closest crowds 88 and 90 in the new bounding box 84 and determines a distance between the two closest crowds 88 and 90. In this example, the distance between the two closest crowds 88 and 90 is less than the optimal inclusion distance. As such, the two closest crowds 88 and 90 are merged and a new crowd center and new optimal inclusion distance are computed, as illustrated in FIG. 9C. The crowd analyzer 56 then repeats the process such that the two closest crowds 88 and 92 in the new bounding box 84 are again merged, as illustrated in FIG. 9D. At this point, the distance between the two closest crowds 86 and 88 is greater than the appropriate optimal inclusion distance. As such, the crowd formation process is complete.

Figure 10A:
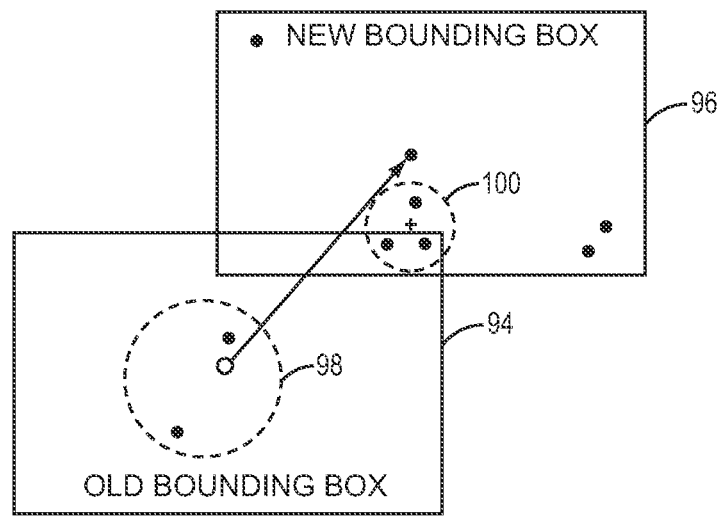

FIGS. 10A through 10F graphically illustrate the crowd formation process of FIGS. 8A through 8D for a scenario where the new and old bounding boxes overlap. As illustrated in FIG. 10A, a user moves from an old location to a new location, as indicated by an arrow. The crowd analyzer 56 receives a location update for the user giving the new location of the user. In response, the crowd analyzer 56 creates an old bounding box 94 for the old location of the user and a new bounding box 96 for the new location of the user. Crowd 98 exists in the old bounding box 94, and crowd 100 exists in the new bounding box 96.

Figure 10B:
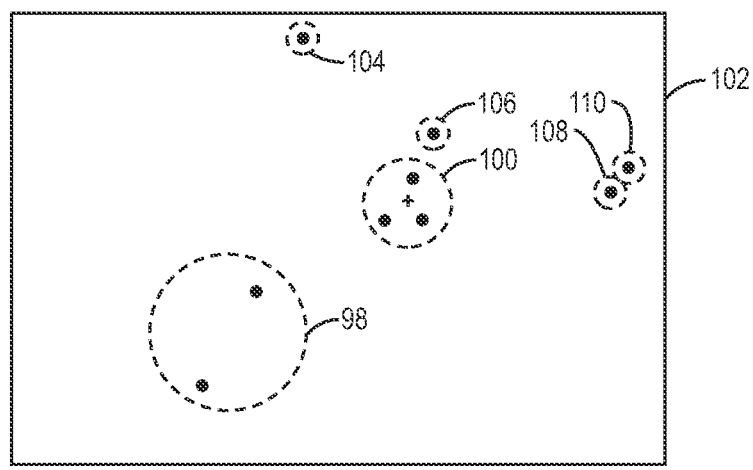

Since the old bounding box 94 and the new bounding box 96 overlap, the crowd analyzer 56 creates a bounding box 102 that encompasses both the old bounding box 94 and the new bounding box 96, as illustrated in FIG. 10B. In addition, the crowd analyzer 56 creates crowds 104 through 110 for individual users currently located within the bounding box 102. The optimal inclusion distances of the crowds 104 through 110 are set to the initial optimal inclusion distance computed by the crowd analyzer 56 based on the density of users in the bounding box 102.

Figure 10C:
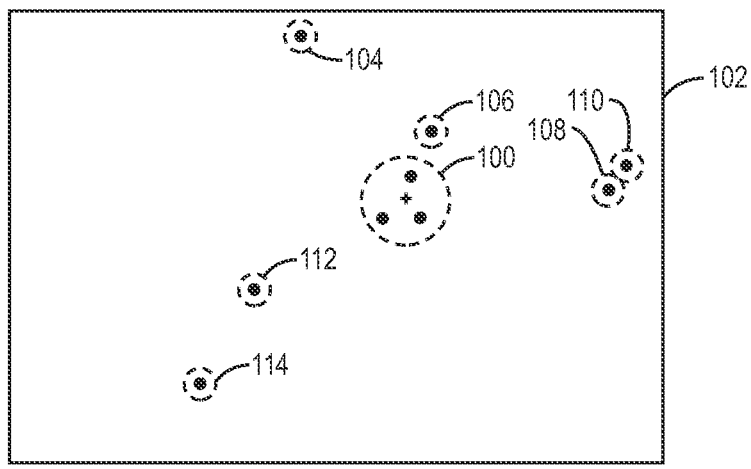

Next, the crowd analyzer 56 analyzes the crowds 98, 100, and 104 through 110 to determine whether any members of the crowds 98, 100, and 104 through 110 violate the optimal inclusion distances of the crowds 98, 100, and 104 through 110. In this example, as a result of the user leaving the crowd 98 and moving to his new location, both of the remaining members of the crowd 98 violate the optimal inclusion distance of the crowd 98. As such, the crowd analyzer 56 removes the remaining users from the crowd 98 and creates crowds 112 and 114 of one user each for those users, as illustrated in FIG. 10C.

Figure 10D:
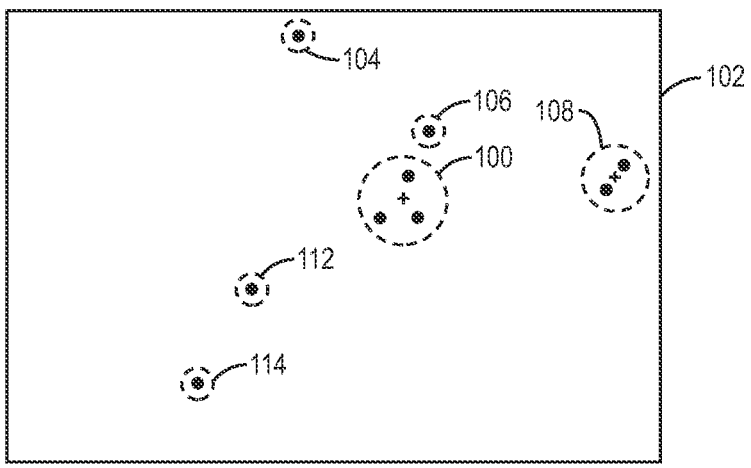

The crowd analyzer 56 then identifies the two closest crowds in the bounding box 102, which in this example are the crowds 108 and 110. Next, the crowd analyzer 56 computes a distance between the two crowds 108 and 110. In this example, the distance between the two crowds 108 and 110 is less than the initial optimal inclusion distance and, as such, the two crowds 108 and 110 are combined. In this example, crowds are combined by merging the smaller crowd into the larger crowd. Since the two crowds 108 and 110 are of the same size, the crowd analyzer 56 merges the crowd 110 into the crowd 108, as illustrated in FIG. 10D. A new crowd center and new optimal inclusion distance are then computed for the crowd 108.

Figure 10E:
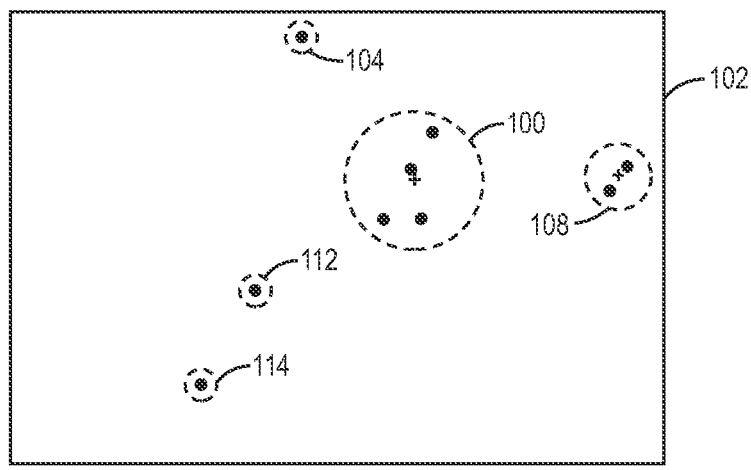
Figure 10F:
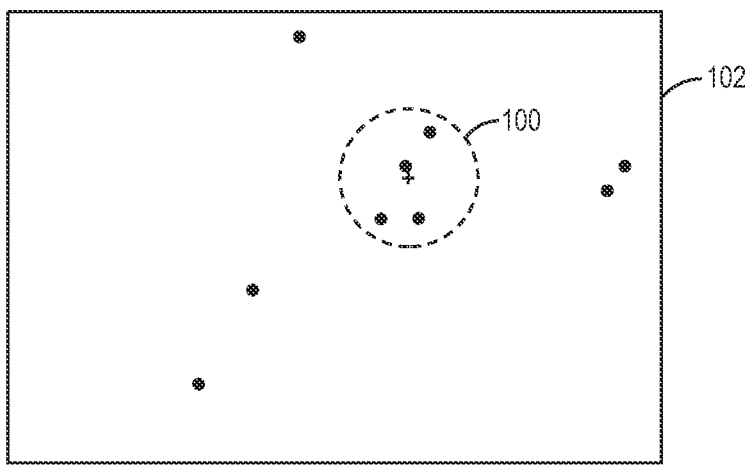

At this point, the crowd analyzer 56 repeats the process and determines that the crowds 100 and 106 are now the two closest crowds. In this example, the distance between the two crowds 100 and 106 is less than the optimal inclusion distance of the larger of the two crowds 100 and 106, which is the crowd 100. As such, the crowd 106 is merged into the crowd 100 and a new crowd center and optimal inclusion distance are computed for the crowd 100, as illustrated in FIG. 10E. At this point, there are no two crowds closer than the optimal inclusion distance of the larger of the two crowds. As such, the crowd analyzer 56 discards any crowds having less than three members, as illustrated in FIG. 10F. In this example, the crowds 104, 108, 112, and 114 have less than three members and are therefore removed. The crowd 100 has three or more members and, as such, is not removed. At this point, the crowd formation process is complete.

Figure 11A:
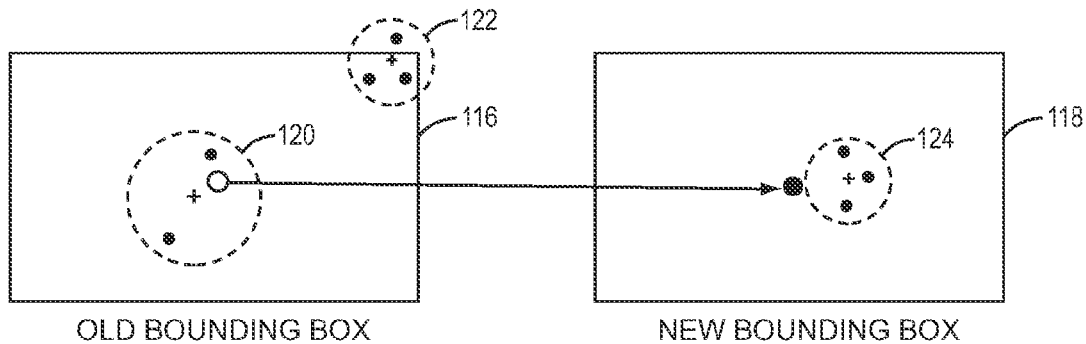

FIGS. 11A through 11E graphically illustrate the crowd formation process of FIGS. 8A through 8D in a scenario where the new and old bounding boxes do not overlap. As illustrated in FIG. 11A, in this example, the user moves from an old location to a new location. The crowd analyzer 56 creates an old bounding box 116 for the old location of the user and a new bounding box 118 for the new location of the user. Crowds 120 and 122 exist in the old bounding box 116, and crowd 124 exists in the new bounding box 118. In this example, since the old and new bounding boxes 116 and 118 do not overlap, the crowd analyzer 56 processes the old and new bounding boxes 116 and 118 separately.

Figure 11B:
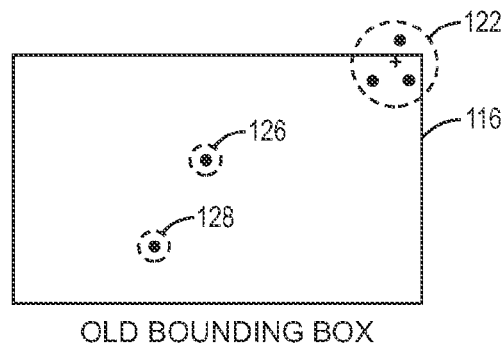
Figure 11C:
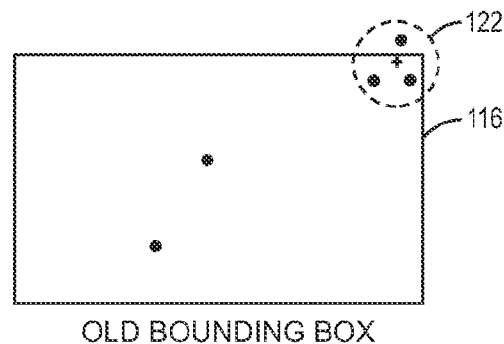

More specifically, as illustrated in FIG. 11B, as a result of the movement of the user from the old location to the new location, the remaining users in the crowd 120 no longer satisfy the optimal inclusion distance for the crowd 120. As such, the remaining users in the crowd 120 are removed from the crowd 120, and crowds 126 and 128 of one user each are created for the removed users as shown in FIG. 11C. In this example, no two crowds in the old bounding box 116 are close enough to be combined. As such, crowds having less than three users are removed, and processing of the old bounding box 116 is complete, and the crowd analyzer 56 proceeds to process the new bounding box 118.

Figure 11D:
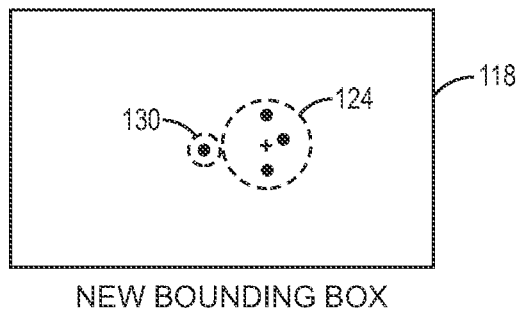
Figure 11E:
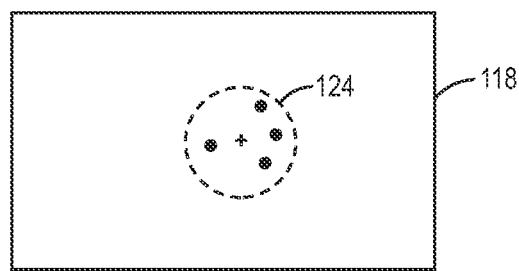

As illustrated in FIG. 11D, processing of the new bounding box 118 begins by the crowd analyzer 56 creating a crowd 130 of one user for the user. The crowd analyzer 56 then identifies the crowds 124 and 130 as the two closest crowds in the new bounding box 118 and determines a distance between the two crowds 124 and 130. In this example, the distance between the two crowds 124 and 130 is less than the optimal inclusion distance of the larger crowd, which is the crowd 124. As such, the crowd analyzer 56 combines the crowds 124 and 130 by merging the crowd 130 into the crowd 124, as illustrated in FIG. 11E. A new crowd center and new optimal inclusion distance are then computed for the crowd 124. At this point, the crowd formation process is complete. Note that the crowd formation processes described above with respect to FIGS. 6 through 11D are exemplary. The present disclosure is not limited thereto. Any type of crowd formation process may be used.

FIG. 12 illustrates the operation of the system 10 to enable a requestor to follow status updates from users in a crowd that matches a select crowd according to one embodiment of the present disclosure. In this embodiment, the requestor is the user 20 of one of the mobile devices 18. However, the requestor is not limited thereto. For example, the requestor may alternatively be the subscriber 24 of the subscriber device 22. First, in this embodiment, the mobile device 18 of the user 20 sends a crowd match request to the MAP server 12 (step 1400). The crowd match request identifies a select crowd for which matching crowds are desired. Preferably, the crowd match request is initiated by the user 20, and the select crowd identified by the crowd match request is selected by the user 20. In this embodiment, the MAP application 32 of the mobile device 18 enables the user 20 to select the select crowd for the crowd match request using any suitable crowd selection technique. For example, the MAP application 32 may present a map to the user 20, where crowds within a geographic area displayed by the map are displayed within the map. The user 20 may then select a crowd from the map and then initiate the crowd match request for the select crowd. As another example, the MAP application 32 may enable the user 20 to initiate the crowd match request for a crowd in which the user 20 is currently located.

In response to receiving the crowd match request, the matching function 59 identifies one or more matching crowds (step 1402). The one or more matching crowds are one or more crowds that match the select crowd identified by the crowd match request at least to a predefined threshold degree. In one embodiment, one or more matching rules are predefined. The one or more matching rules may be defined by the user 20 (i.e., the requestor) or may be system defined. If defined by the user 20, the one or more matching rules may be included in the crowd match request or may be defined by the user 20 prior to sending the crowd match request and stored in the user account for the user 20 maintained by the MAP server 12.

The one or more matching rules are generally one or more rules that must be satisfied in order for a crowd to be determined to match the select crowd identified in the crowd match request and/or one or more criteria that when satisfied result in a determination that a crowd does not match the select crowd identified in the crowd match request. The one or more matching rules are based on crowd data that describes the crowds being compared such as, for example, aggregate profiles of the crowds and/or characteristics of the crowds. The characteristics of the crowds may include, for example, the sizes of the crowds (i.e., the number of users in the crowds), the geographic locations of the crowds (e.g., crowd centers of the crowds), degree of fragmentation of the crowds, best-case average degree of separation, worst-case average degree of separation, or degree of bidirectionality. For more information regarding degree of fragmentation of the crowds, best-case average degree of separation, worst-case average degree of separation, or degree of bidirectionality, the interested reader is directed to the published U.S. Patent Applications incorporated by reference above.

For example, for each crowd, the aggregate profile of the crowd may include a list of interests, or keywords, that occur in the user profiles of the users 20 in that crowd and, for each interest, either a number of user matches for that interest in the user profiles of the users 20 in the crowd or a ratio of the number of user matches for that interest in the user profiles of the users 20 in the crowd over the total number of users in the crowd. Thus, if the interest "Sports" is in the user profiles of 3 of 5 users in a crowd and the interest "Cars" is in the user profiles of 2 of the 5 users in the crowd, then the aggregate profile of the crowd may include a list of interests for the crowd that includes "Sports," "Cars," and any other interests in the user profiles of the users 20 in the crowd. In addition, the aggregate profile of the crowd may include the number of user matches for the interests "Sports" and "Cars," which are 3 and 2 respectively. Alternatively, the aggregate profile of the crowd may include the ratio of user matches to total number of users for the interests "Sports" and "Cars," which are $3/5$ and $2/5$ respectively. The one or more matching rules may be defined such that a crowd matches the select crowd identified by the crowd match request if at least 3 out of the 5 top interests (e.g., the interests having the 5 highest numbers of user matches or the interests having the 5 highest ratios of numbers of user matches to total number of users in the crowd) for the two crowds match. Notably, in one embodiment, two interests may be determined to match if the two interests, or keywords, exactly match or are otherwise determined to match at least to a predefined threshold degree via natural language processing or some similar technique. For instance, the interests of "NC State" and "North Carolina State University" would preferably be determined to be matching interests even though the string representation of the two interests are not an exact match.

As another example, the one or more matching rules may include a first matching rule that states that at least 75% of the interests in the aggregate profiles of two crowds must match, a second matching rule that states that the two crowds must be within a defined distance from one another (e.g., 5 miles), a third matching rule that states that the sizes of the two crowds must match to within 10% of the size of the select crowd, and a fourth rule that states that the degree of fragmentation of the other crowd is to be less than or equal to that of the select crowd. Notably, while the exemplary matching rules above are positive rules that define conditions under which two crowds are determined to match, the one or more matching rules may alternatively be or include one or more negative rules that define conditions under which two crowds are determined not to match. Further, the exemplary matching rules given above are exemplary and are not intended to limit the scope of the present disclosure.

In another embodiment, the one or more matching crowds are identified by generating matching scores that represent the degree of similarity between the select crowd identified by the crowd match request and at least some of the other crowds formed by the MAP server 12. For a particular pair of crowds, the matching score for the pair of crowds may be a function of a comparison of the aggregate profiles of the crowds and/or characteristics of the crowds (e.g., crowd size, crowd location, degree of fragmentation, best-case average degree of separation, worst-case average degree of separation, or degree of bidirectionality).

Next, in this embodiment, the matching function 59 of the MAP server 12 returns the one or more matching crowds to the mobile device 18 (step 1404). More specifically, the matching function 59 returns information that identifies and potentially describes the one or more matching crowds to the mobile device 18. For example, the matching function 59 may return crowd identifiers (IDs) of the one or more matching crowds and, optionally, the aggregate profiles of the one or more matching crowds and/or one or more characteristics of the one or more matching crowds. In this embodiment, the MAP application 32 of the mobile device 18 then presents the one or more matching crowds to the user 20 (step 1406). In one embodiment, the one or more matching crowds are presented as a list of matching crowds. In another embodiment, the one or more matching crowds are presented on a map that shows the geographic locations of the one or more matching crowds. In either case, the additional information about the one or more matching crowds (e.g., aggregate profiles and/or crowd characteristics) may also be presented to the user 20.

Next, the MAP application 32 receives user input from the user 20 that selects a desired crowd from the one or more matching crowds (step 1408). While only one desired crowd is selected in this example, note that the user 20 may be enabled to select one or more desired crowds from the one or more matching crowds. The MAP application 32 then sends the desired crowd, or more specifically information that identifies the desired crowd, to the MAP server 12 (step 1410). In response, the status update function 60 of the MAP server 12 identifies the users 20 in the desired crowd (step 1412). In one embodiment, the MAP server 12 maintains a crowd record for each crowd of users formed by the MAP server 12, where the crowd record of a crowd includes a list of users that are currently in the crowd. Thus, the status update function 60 is enabled to identify the users 20 in the desired crowd using the crowd record stored for the desired crowd.

The status update function 60 then sends a status update request to the status update service 26 for status updates sent by the users 20 in the desired crowd (step 1414). In response, the status update service 26 returns status updates sent by the users 20 in the desired crowd to the MAP server 12 (step 1416). More specifically, in this embodiment, the status update service 26 records the MAP server 12 as a follower of the users 20 in the desired crowd. Thereafter, as status updates are received from the users 20 in the desired crowd, the status updates are returned to the MAP server 12. In addition, the status update service 26 may return status updates previously received from the users 20 in the desired crowd for some defined time period prior to the current time (e.g., the previous hour). However, in an alternative embodiment, the status update service 26 may record the user 20 of the mobile device 18 (i.e., the requestor) as a follower of the users 20 in the desired crowd. Thereafter, as status updates are received from the users 20 in the desired crowd, the status update service 26 may return the status updates directly to the mobile device 18 of the user 20 or return the status updates to the mobile device 18 of the user 20 via the MAP server 12. In addition, the status update service 26 may return status updates previously received from the users 20 in the desired crowd for some defined time period prior to the current time (e.g., the previous hour).

In this embodiment, once the status updates from the users 20 in the desired crowd are received by the MAP server 12, the status update function 60 of the MAP server 12 returns the status updates to the mobile device 18 (step 1418). Then, the MAP application 32 of the mobile device 18 presents the status updates to the user 20 (step 1420). Notably, in this embodiment, the user 20 selects a desired crowd for which status updates are to be obtained and returned to the mobile device 18. However, the present disclosure is not limited thereto. In an alternative embodiment, after the matching function 59 identifies the one or more matching crowds in step 1402, the status update function 60 sends one or more status update requests to the status update service 26 for status updates sent by the users 20 in the one or more matching crowds. The status update service 26 may then return the status updates sent by the users 20 in the one or more matching crowds to the MAP server 12 or, alternatively, to the mobile device 18, as described above. In this alternative embodiment, the MAP application 32 may then present all of the status updates from the users 20 in the one or more matching crowds to the user 20 at the mobile device 18 or enable the user 20 to filter the status updates based on, for example, crowd. For instance, while all of the status updates sent by the users 20 in the one or more matching crowds may be returned to the mobile device 18, the MAP application 32 may enable the user 20 to select one or more desired crowds from the matching crowds such that only the status updates from the users 20 in the desired crowd(s) are presented to the user 20. In a similar manner, the user 20 may be enabled to filter the status updates based on other parameters such as, for example, crowd characteristics (e.g., crowd location, crowd size, etc.) and/or interests included in the aggregate profiles of the crowds.

FIGS. 13A and 13B illustrate the operation of the system 10 to enable a requestor to follow status updates from users in a crowd that matches a select crowd according to another embodiment of the present disclosure. This embodiment is similar to that of FIG. 12 but where the status update function 60 obtains status updates locally rather than from the status update service 26. More specifically, FIG. 13A illustrates the operation of the status update function 60 of the MAP server 12 to process status updates sent by the users 20 according to one embodiment of the present disclosure. First, the mobile device 18 generates a status update for the user 20 (step 1500). More specifically, in this embodiment, the MAP application 32 of the mobile device 18 enables the user 20 to enter text, audio, and/or video for a status update to be sent by the user 20. The MAP application 32 of the mobile device 18 then sends the status update to the MAP server 12 (step 1502). In response, the status update function 60 of the MAP server 12 stores the status update (step 1504). The status update may be stored, for example, in a user record of the user 20 that sent the status update. The status update function 60 of the MAP server 12 also sends the status update to the status update service 26 (step 1506). The status update service 26 may then publish, or otherwise distribute, the status update according to the normal operation of the status update service 26 (step 1508). This process is repeated for numerous status updates received from the users 20 of the mobile devices 18. In this manner, the MAP server 12 has access to status updates sent by the users 20 locally.

FIG. 13B illustrates the operation of the status update function 60 to enable a requestor to follow status updates from users in a crowd that matches a select crowd based on the status update processing of FIG. 13A according to one embodiment of the present disclosure. In this embodiment, the requestor is the user 20 of one of the mobile devices 18. However, the requestor is not limited thereto. For example, the requestor may alternatively be the subscriber 24 of the subscriber device 22. First, the mobile device 18 of the user 20 sends a crowd match request to the MAP server 12 (step 1600). In response to receiving the crowd match request, the matching function 59 identifies one or more matching crowds (step 1602) and returns the one or more matching crowds to the mobile device (step 1604). The MAP application 32 of the mobile device 18 then presents the one or more matching crowds to the user 20 (step 1606). Next, the MAP application 32 receives user input from the user 20 that selects a desired crowd from the one or more matching crowds (step 1608). The MAP application 32 then sends the desired crowd, or more specifically information that identifies the desired crowd, to the MAP server 12 (step 1610). Until this point, the process is the same as described above with respect to FIG. 12. As such, the details have not been repeated.

In response, the status update function 60 of the MAP server 12 identifies the users 20 in the desired crowd (step 1612). In one embodiment, the MAP server 12 maintains a crowd record for each crowd of users formed by the MAP server 12, where the crowd record of a crowd includes a list of users that is currently in the crowd. Thus, the status update function 60 may identify the users 20 in the desired crowd using the crowd record of the desired crowd. The status update function 60 then obtains status updates sent by the users 20 in the desired crowd (step 1614) and returns the status updates to the mobile device 18 of the user 20 (step 1616). More specifically, in one embodiment, the user 20 of the mobile device 18 is recorded as a follower of the users 20 in the desired crowd. Thereafter, as the status update function 60 receives status updates from the users 20 in the desired crowd, the status update function 60 sends the status updates to the mobile device 18 of the user 20. In addition, the status update function 60 may obtain status updates previously received from the users 20 in the desired crowd for some defined time period prior to the current time (e.g., the previous hour) from local storage and return those status updates to the mobile device 18 of the user 20.

Next, the MAP application 32 of the mobile device 18 presents the status updates to the user 20 (step 1618). Notably, in this embodiment, the user 20 selects a desired crowd for which status updates are to be obtained and returned to the mobile device 18. However, the present disclosure is not limited thereto. In an alternative embodiment, after the matching function 59 identifies the one or more matching crowds in step 1602, the status update function 60 obtains status updates sent by the users 20 in the one or more matching crowds. The status update function 60 may then return the status updates sent by the users 20 in the one or more matching crowds to the mobile device 18. In this alternative embodiment, the MAP application 32 may then present all of the status updates from the users 20 in the one or more matching crowds to the user 20 at the mobile device 18 or enable the user 20 to filter the status updates based on, for example, crowd. For instance, while all of the status updates sent by the users 20 in the one or more matching crowds may be returned to the mobile device 18, the MAP application 32 may enable the user 20 to select one or more desired crowds from the matching crowds such that only the status updates from the users 20 in the desired crowd(s) are presented to the user 20. In a similar manner, the user 20 may be enabled to filter the status updates based on other parameters such as, for example, crowd characteristics (e.g., crowd location, crowd size, etc.) and/or interests included in the aggregate profiles of the crowds.

FIG. 14 illustrates the operation of the system 10 to enable a requestor to follow status updates from users at a POI that matches a select POI according to one embodiment of the present disclosure. Before proceeding, it should be noted that the MAP server 12 may maintain a database of POIs or have access to a remote database of POIs. Further, the POIs may be system-defined POIs such as those provided by navigation devices and/or user-defined POIs defined by users such as, but not limited to, the users 20. In this embodiment, the requestor is the user 20 of one of the mobile devices 18. However, the requestor is not limited thereto. For example, the requestor may alternatively be the subscriber 24 of the subscriber device 22. First, in this embodiment, the mobile device 18 of the user 20 sends a POI match request to the MAP server 12 (step 1700). The POI match request identifies a select POI for which matching POIs are desired. Preferably, the POI match request is initiated by the user 20, and the select POI identified by the POI match request is selected by the user 20. In this embodiment, the MAP application 32 of the mobile device 18 enables the user 20 to select the select POI for the POI match request using any suitable POI selection technique. For example, the MAP application 32 may present a map to the user 20, where POIs within a geographic area displayed by the map are displayed within the map. The user 20 may then select a POI from the map and then initiate the POI match request for the select POI. As another example, the MAP application 32 may enable the user 20 to initiate the POI match request for a POI at which the user 20 is currently located.

In response to receiving the POI match request, the matching function 59 of the MAP server 12 identifies one or more matching POIs (step 1702). The one or more matching POIs are one or more POIs that match the select POI identified by the POI match request at least to a predefined threshold degree. In one embodiment, one or more matching rules are predefined. The one or more matching rules may be defined by the user 20 (i.e., the requestor) or may be system defined. If defined by the user 20, the one or more matching rules may be included in the POI match request or may be defined by the user 20 prior to sending the POI match request and stored in the user account for the user 20 maintained by the MAP server 12.

The one or more matching rules are generally one or more rules that must be satisfied in order for a POI to be determined to match the select POI identified in the POI match request and/or one or more criteria that when satisfied result in a determination that a POI does not match the select POI identified in the POI match request. The one or more matching rules are based on data that describes the POIs being compared such as, for example, data that describes POI type (e.g., restaurant, sports bar, dance club, or the like), a name of the POI (e.g., Sam's Steakhouse, Kegler's Sports Bar, or the like), data that describes an event being held at the POI (e.g., data that describes a concert being held at a stadium/POI such as the name of the music artist or group), a geographic location of the POI, a number of users at the POI, and/or a number of crowds at the POI.

For example, the one or more matching rules may be defined such that a POI matches the select POI identified by the POI match request if the POI is of the same POI type as the select POI. As another example, the one or more matching rules may include a first POI matching rule that states that the two POIs must be of the same POI type, a second POI matching rule that states that the two POIs must be within a defined distance from one another (e.g., 1 mile), and a third POI matching rule that states that the number of users and/or crowds at the POI must not exceed the number of users and/or crowds at the select POI. Notably, while the exemplary matching rules above are positive rules that define conditions under which two POIs are determined to match, the one or more matching rules may alternatively be or include one or more negative rules that define conditions under which two POIs are determined not to match. Further, the exemplary matching rules given above are exemplary and are not intended to limit the scope of the present disclosure.

Next, in this embodiment, the matching function 59 of the MAP server 12 returns the one or more matching POIs to the mobile device 18 (step 1704). More specifically, the matching function 59 returns information that identifies and potentially describes the one or more matching POIs to the mobile device 18. For example, the status update function 60 may return the names, locations, and POI types for the one or more matching POIs. In this embodiment, the MAP application 32 of the mobile device 18 then presents the one or more matching POIs to the user 20 (step 1706). In one embodiment, the one or more matching POIs are presented as a list of matching POIs. In another embodiment, the one or more matching POIs are presented on a map that shows the geographic locations of the one or more matching POIs. In another embodiment, the matching function 59 may also return information about any crowds present at the matching POIs. The MAP application 32 may then filter the list of matching POIs based on the presence or absence of crowds, or the characteristics of the crowds present at the POIs, before presenting the list to the user 20. In either case, additional information about the one or more matching POIs (e.g., POI type, event data, information about the crowds present at the POI, or the like) may also be presented to the user 20.

Next, the MAP application 32 receives user input from the user 20 that selects a desired POI from the one or more matching POIs (step 1708). While only one desired POI is selected in this example, note that the user 20 may be enabled to select one or more desired POIs from the one or more matching POIs. The MAP application 32 then sends the desired POI, or more specifically information that identifies the desired POI, to the MAP server 12 (step 1710). In response, the status update function 60 of the MAP server 12 identifies the users 20 in one or more crowds located at the desired POI (step 1712). In one embodiment, the MAP server 12 maintains a crowd record for each crowd of users formed by the MAP server 12, where the crowd record of a crowd includes a list of users that is currently in the crowd and data that defines the location of the crowd (e.g., a crowd center). More specifically, in one embodiment, POIs are defined as a geographic location (e.g., a latitude and longitude coordinate pair or a street address). In this case, a crowd is determined to be at a POI when the crowd is located within a predefined geographic area that is centered at or otherwise encompasses the POI. A crowd may be determined to be located within the predefined geographic area if, for example, the crowd center of the crowd is within the predefined geographic area, at least one of the users 20 in the crowd is located within the predefined geographic area, or if the boundary of the crowd overlaps the predefined geographic area. The predefined geographic area may be a system-defined shape and size that is used for all POIs or for a particular class of POIs. In another embodiment, POIs are defined as geographic areas (e.g., a circular geographic area defined by a latitude and longitude pair and a radius). In this case, a crowd is located at a POI if, for example, the crowd center of the crowd is within the geographic area for the POI, at least one of the users 20 in the crowd is located within the geographic area for the POI, or if the boundary of the crowd overlaps the geographic area for the POI. Alternatively, or in addition, a crowd is considered to be located at a POI if one or more of the users 20 in the crowd are determined to be at the POI from, for instance, the users' check-in information.

Next, the status update function 60 sends a status update request to the status update service 26 for status updates sent by the users 20 in the one or more crowds at the desired POI (step 1714). In response, the status update service 26 returns status updates sent by the users 20 in the one or more crowds at the desired POI to the MAP server 12 (step 1716). More specifically, in this embodiment, the status update service 26 records the MAP server 12 as a follower of the users 20 in the one or more crowds at the desired POI. Thereafter, as status updates are received from the users 20 in the one or more crowds at the desired POI, the status updates are returned to the MAP server 12. In addition, the status update service 26 may return status updates previously received from the users 20 in the one or more crowds at the desired POI for some defined time period prior to the current time (e.g., the previous hour). However, in an alternative embodiment, the status update service 26 may record the user 20 of the mobile device 18 (i.e., the requestor) as a follower of the users 20 in the one or more crowds at the desired POI. Thereafter, as status updates are received from the users 20 in the one or more crowds at the desired POI, the status update service 26 may return the status updates directly to the mobile device 18 of the user 20 or return the status updates to the mobile device 18 of the user 20 via the MAP server 12. In addition, the status update service 26 may return status updates previously received from the users 20 in the one or more crowds at the desired POI for some defined time period prior to the current time (e.g., the previous hour).

In this embodiment, once the status updates from the users 20 in the one or more crowds at the desired POI are received by the MAP server 12, the status update function 60 of the MAP server 12 returns the status updates to the mobile device 18 (step 1718). Then, the MAP application 32 of the mobile device 18 presents the status updates to the user 20 (step 1720). Notably, in this embodiment, the user 20 selects a desired POI for which status updates are to be obtained and returned to the mobile device 18. However, the present disclosure is not limited thereto. In an alternative embodiment, after the matching function 59 identifies the one or more matching POIs in step 1702, the status update function 60 sends one or more status update requests to the status update service 26 for status updates sent by the users 20 in one or more crowds at the one or more matching POIs. The status update service 26 may then return the status updates sent by the users 20 in the one or more crowds at the one or more matching POIs to the MAP server 12 or, alternatively, to the mobile device 18, as described above. In this alternative embodiment, the MAP application 32 may then present all of the status updates from the users 20 in the one or more crowds at the one or more matching POIs to the user 20 at the mobile device 18 or enable the user 20 to filter the status updates based on, for example, POI. For instance, while all of the status updates sent by the users 20 in the one or more crowds at the one or more matching POIs may be returned to the mobile device 18, the MAP application 32 may enable the user 20 to select one or more desired POIs from the matching POIs such that only the status updates from the users 20 in the crowd(s) at the desired POI(s) are presented to the user 20. In a similar manner, the user 20 may be enabled to filter the status updates based on other parameters such as, for example, POI type, POI location, or other data that describes the matching POIs.

In the embodiment described above, the MAP server 12 identifies the users 20 in one or more crowds at the desired POI. However, in an alternative embodiment, the MAP server 12 may identify the users 20, rather than the crowds, at the desired POI. The MAP server 12 may then operate such that status updates sent by the users 20 at one or more desired POIs, or alternatively all of the matching POIs, are obtained and returned to the mobile device 18 of the user 20 in a manner similar to that described above.

FIGS. 15A and 15B illustrate the operation of the system 10 to enable a requestor to follow status updates from users at a POI that matches a select POI according to another embodiment of the present disclosure. This embodiment is similar to that of FIG. 14 but where the status update function 60 obtains status updates locally rather than from the status update service 26. More specifically, FIG. 15A illustrates the operation of the status update function 60 of the MAP server 12 to process status updates sent by the users 20 according to one embodiment of the present disclosure. This process is the same as that described above with respect to FIG. 13A. First, the mobile device 18 generates a status update for the user 20 (step 1800). More specifically, in this embodiment, the MAP application 32 of the mobile device 18 enables the user 20 to enter text, audio, and/or video for a status update to be sent by the user 20. The MAP application 32 of the mobile device 18 then sends the status update to the MAP server 12 (step 1802). In response, the status update function 60 of the MAP server 12 stores the status update (step 1804). The status update may be stored, for example, in a user record of the user 20 that sent the status update. The status update function 60 of the MAP server 12 also sends the status update to the status update service 26 (step 1806). The status update service 26 may then publish, or otherwise distribute, the status update according to the normal operation of the status update service 26 (step 1808). This process is repeated for numerous status updates received from the users 20 of the mobile devices 18. In this manner, the MAP server 12 has access to status updates sent by the users 20 locally.

FIG. 15B illustrates the operation of the status update function 60 to enable a requestor to follow status updates from users at a POI that matches a select POI based on the status update processing of FIG. 15A according to one embodiment of the present disclosure. In this embodiment, the requestor is the user 20 of one of the mobile devices 18. However, the requestor is not limited thereto. For example, the requestor may alternatively be the subscriber 24 of the subscriber device 22. First, the mobile device 18 of the user 20 sends a POI match request to the MAP server 12 (step 1900). In response to receiving the POI match request, the matching function 59 identifies one or more matching POIs (step 1902) and returns the one or more matching POIs to the mobile device (step 1904). The MAP application 32 of the mobile device 18 then presents the one or more matching POIs to the user 20 (step 1906). Next, the MAP application 32 receives user input from the user 20 that selects a desired POI from the one or more matching POIs (step 1908). The MAP application 32 then sends the desired POI, or more specifically information that identifies the desired POI, to the MAP server 12 (step 1910). Until this point, the process is the same as described above with respect to FIG. 14. As such, the details have not been repeated.

In response, the status update function 60 of the MAP server 12 identifies the users 20 in one or more crowds at the desired POI (step 1912). In one embodiment, the MAP server 12 maintains a crowd record for each crowd of users formed by the MAP server 12, where the crowd record of a crowd includes a list of users that is currently in the crowd and the location of the crowd (e.g., a crowd center). The status update function 60 identifies the users 20 in the one or more crowds at the desired POI using the crowd records of those crowds. The status update function 60 then obtains status updates sent by the users 20 in the one or more crowds at the desired POI (step 1914) and returns the status updates to the mobile device 18 of the user 20 (step 1916). More specifically, in one embodiment, the user 20 of the mobile device 18 is recorded as a follower of the users 20 in the one or more crowds at the desired POI. Thereafter, as the status update function 60 receives status updates from the users 20 in the one or more crowds at the desired POI, the status update function 60 sends the status updates to the mobile device 18 of the user 20. In addition, the status update function 60 may obtain status updates previously received from the users 20 in the one or more crowds at the desired POI for some defined time period prior to the current time (e.g., the previous hour) and return those status updates to the mobile device 18 of the user 20.

Next, the MAP application 32 of the mobile device 18 presents the status updates to the user 20 (step 1918). Notably, in this embodiment, the user 20 selects a desired POI for which status updates are to be obtained and returned to the mobile device 18. However, the present disclosure is not limited thereto. In an alternative embodiment, after the matching function 59 identifies the one or more matching POIs in step 1902, the status update function 60 obtains and returns status updates sent by the users 20 in the one or more crowds at the one or more matching POIs to the mobile device 18, as described above. In this alternative embodiment, the MAP application 32 may then present all of the status updates from the users 20 in the one or more crowds at the one or more matching POIs to the user 20 at the mobile device 18 or enable the user 20 to filter the status updates based on, for example, POI. For instance, while all of the status updates sent by the users 20 in the one or more crowds at the one or more matching POIs may be returned to the mobile device 18, the MAP application 32 may enable the user 20 to select one or more desired POIs from the matching POIs such that only the status updates from the users 20 in the crowd(s) at the desired POI(s) are presented to the user 20. In a similar manner, the user 20 may be enabled to filter the status updates based on other parameters such as, for example, POI type, POI location, or other data that describes the matching POIs.

In the embodiment described above, the MAP server 12 identifies the users 20 in one or more crowds at the desired POI. However, in an alternative embodiment, the MAP server 12 may identify the users 20, rather than the crowds, at the desired POI. The MAP server 12 may then operate such that status updates sent by the users 20 at one or more desired POIs, or alternatively all of the matching POIs, are obtained and returned to the mobile device 18 of the user 20.

FIG. 16 is a block diagram of the MAP server 12 according to one embodiment of the present disclosure. As illustrated, the MAP server 12 includes a controller 132 connected to memory 134, one or more secondary storage devices 136, and a communication interface 138 by a bus 140 or similar mechanism. The controller 132 is a microprocessor, digital Application Specific Integrated Circuit (ASIC), Field Programmable Gate Array (FPGA), or similar hardware component. In this embodiment, the controller 132 is a microprocessor, and the application layer 40, the business logic layer 42, and the object mapping layer 62 (FIG. 2) are implemented in software and stored in the memory 134 for execution by the controller 132. Further, the datastore 64 (FIG. 2) may be implemented in the one or more secondary storage devices 136. The secondary storage devices 136 are digital data storage devices such as, for example, one or more hard disk drives. The communication interface 138 is a wired or wireless communication interface that communicatively couples the MAP server 12 to the network 28 (FIG. 1). For example, the communication interface 138 may be an Ethernet interface, local wireless interface such as a wireless interface operating according to one of the suite of IEEE 802.11 standards, or the like.

FIG. 17 is a block diagram of one of the mobile devices 18 according to one embodiment of the present disclosure. This discussion is equally applicable to the other mobile devices 18. As illustrated, the mobile device 18 includes a controller 142 connected to memory 144, a communication interface 146, one or more user interface components 148, and the location function 36 by a bus 150 or similar mechanism. The controller 142 is a microprocessor, digital ASIC, FPGA, or similar hardware component. In this embodiment, the controller 142 is a microprocessor, and the MAP client 30, the MAP application 32, and the third-party applications 34 are implemented in software and stored in the memory 144 for execution by the controller 142. In this embodiment, the location function 36 is a hardware component such as, for example, a GPS receiver. The communication interface 146 is a wireless communication interface that communicatively couples the mobile device 18 to the network 28 (FIG. 1). For example, the communication interface 146 may be a local wireless interface such as a wireless interface operating according to one of the suite of IEEE 802.11 standards, a mobile communications interface such as a cellular telecommunications interface (e.g., a 3G interface such as a Global System for Mobile Communications (GSM) interface, a 4G interface such as a Long Term Evolution (LTE) interface, or the like), or the like. The one or more user interface components 148 include, for example, a touchscreen, a display, one or more user input components (e.g., a keypad), a speaker, or the like, or any combination thereof.

FIG. 18 is a block diagram of the subscriber device 22 according to one embodiment of the present disclosure. As illustrated, the subscriber device 22 includes a controller 152 connected to memory 154, one or more secondary storage devices 156, a communication interface 158, and one or more user interface components 160 by a bus 162 or similar mechanism. The controller 152 is a microprocessor, digital ASIC, FPGA, or similar hardware component. In this embodiment, the controller 152 is a microprocessor, and the web browser 38 (FIG. 1) is implemented in software and stored in the memory 154 for execution by the controller 152. The one or more secondary storage devices 156 are digital data storage devices such as, for example, one or more hard disk drives. The communication interface 158 is a wired or wireless communication interface that communicatively couples the subscriber device 22 to the network 28 (FIG. 1). For example, the communication interface 158 may be an Ethernet interface, local wireless interface such as a wireless interface operating according to one of the suite of IEEE 802.11 standards, a mobile communications interface such as a cellular telecommunications interface, or the like. The one or more user interface components 160 include, for example, a touchscreen, a display, one or more user input components (e.g., a keypad), a speaker, or the like, or any combination thereof.

FIG. 19 is a block diagram of a computing device 164 operating to host the status update service 26 according to one embodiment of the present disclosure. The computing device 164 may be, for example, a server computer. As illustrated, the computing device 164 includes a controller 166 connected to memory 168, one or more secondary storage devices 170, a communication interface 172, and one or more user interface components 174 by a bus 176 or similar mechanism. The controller 166 is a microprocessor, digital ASIC, FPGA, or similar hardware component. In this embodiment, the controller 166 is a microprocessor, and the status update service 26 is implemented in software and stored in the memory 168 for execution by the controller 166. The one or more secondary storage devices 170 are digital data storage devices such as, for example, one or more hard disk drives. The communication interface 172 is a wired or wireless communication interface that communicatively couples the computing device 164 to the network 28 (FIG. 1). For example, the communication interface 172 may be an Ethernet interface, local wireless interface such as a wireless interface operating according to one of the suite of IEEE 802.11 standards, a mobile communications interface such as a cellular telecommunications interface, or the like. The one or more user interface components 174 include, for example, a touchscreen, a display, one or more user input components (e.g., a keypad), a speaker, or the like, or any combination thereof.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method comprising:
    receiving, from a requestor, a crowd match request that identifies a select crowd;
    in response to receiving the crowd match request, identifying one or more matching crowds that match the select crowd at least to a predefined threshold degree based on aggregate profiles of the select crowd and the one or more matching crowds; and
    effecting delivery of status updates sent by users in at least one crowd of the one or more matching crowds to the requestor.

2. The method of claim 1 further comprising:
    returning the one or more matching crowds to the requestor; and
    receiving, from the requestor, a selection of one of the one or more matching crowds as a desired crowd;
    wherein effecting delivery of the status updates sent by the users in the at least one crowd of the one or more matching crowds to the requestor comprises effecting delivery of status updates sent by a plurality of users in the desired crowd to the requestor.

3. The method of claim 2 wherein effecting delivery of the status updates sent by the plurality of users in the desired crowd to the requestor comprises:
    identifying the plurality of users in the desired crowd;
    obtaining the status updates sent by the plurality of users in the desired crowd; and
    sending the status updates to the requestor.

4. The method of claim 3 wherein obtaining the status updates sent by the plurality of users in the desired crowd comprises obtaining the status updates sent by the plurality of users in the desired crowd from a third-party status update service.

5. The method of claim 3 wherein obtaining the status updates sent by the plurality of users in the desired crowd comprises receiving the status updates sent by the plurality of users in the desired crowd from mobile devices of the plurality of users in the desired crowd as the status updates are sent by the plurality of users.

6. The method of claim 5 further comprising sending the status updates sent by the plurality of users in the desired crowd to a third-party status update service as the status updates are received.

7. The method of claim 3 wherein sending the status updates to the requestor comprises sending the status updates to a device of the requestor for presentation to the requestor.

8. The method of claim 2 wherein effecting delivery of the status updates sent by the plurality of users in the desired crowd to the requestor comprises:
    identifying the plurality of users in the desired crowd; and
    sending a status update request to a third-party status update service that instructs the third-party status update service to send status updates sent by the plurality of users in the desired crowd to the requestor.

9. The method of claim 1 wherein effecting delivery of the status updates sent by the users in the at least one crowd of the one or more matching crowds to the requestor comprises effecting delivery of status updates sent by a plurality of users in the one or more matching crowds to the requestor.

10. The method of claim 9 wherein effecting delivery of the status updates sent by the plurality of users in the one or more matching crowds to the requestor comprises:
   identifying the plurality of users in the one or more matching crowds;
   obtaining the status updates sent by the plurality of users in the one or more matching crowds; and
   sending the status updates to the requestor.

11. The method of claim 10 wherein obtaining the status updates sent by the plurality of users in the one or more matching crowds comprises obtaining the status updates sent by the plurality of users in the one or more matching crowds from a third-party status update service.

12. The method of claim 10 wherein obtaining the status updates sent by the plurality of users in the one or more matching crowds comprises receiving the status updates sent by the plurality of users in the one or more matching crowds from mobile devices of the plurality of users in the one or more matching crowds as the status updates are sent by the plurality of users.

13. The method of claim 12 further comprising sending the status updates sent by the plurality of users in the one or more matching crowds to a third-party status update service as the status updates are received.

14. The method of claim 10 wherein sending the status updates to the requestor comprises sending the status updates to a device of the requestor for presentation to the requestor.

15. The method of claim 9 wherein effecting delivery of the status updates sent by the plurality of users in the one or more matching crowds to the requestor comprises:
   identifying the plurality of users in the one or more matching crowds; and
   sending a status update request to a third-party status update service that instructs the third-party status update service to send status updates sent by the plurality of users in the one or more matching crowds to the requestor.

16. The method of claim 1 wherein the select crowd is a current crowd in which the requestor is located at a time of the crowd match request.

17. The method of claim 1 wherein the select crowd is a crowd selected by the requestor.

18. A computer-implemented method comprising:
   receiving, from a requestor, a crowd match request that identifies a select crowd;
   in response to receiving the crowd match request, identifying one or more matching crowds that match the select crowd at least to a predefined threshold degree based on geographic locations of the select crowd and the one or more matching crowds; and
   effecting delivery of status updates sent by users in at least one crowd of the one or more matching crowds to the requestor.

19. A computer-implemented method comprising:
   receiving, from a requestor, a crowd match request that identifies a select crowd;
   in response to receiving the crowd match request, identifying one or more matching crowds that match the select crowd at least to a predefined threshold degree based on one or more crowd characteristics of the select crowd and the one or more matching crowds; and
   effecting delivery of status updates sent by users in at least one crowd of the one or more matching crowds to the requestor.

20. A server computer comprising system components including:
   a communication interface adapted to communicatively couple the server computer to a network; and
   a controller associated with the communication interface and adapted to:
      receive, via the communication interface, a crowd match request from a requestor that identifies a select crowd;
      in response to the crowd match request, identify one or more matching crowds that match the select crowd at least to a predefined threshold degree based on aggregate profiles of the select crowd and the one or more matching crowds; and
      effect delivery of status updates sent by users in at least one crowd of the one or more matching crowds to the requestor,
   wherein at least one of the system components includes at least one electronic hardware component.

21. A non-transitory computer readable medium storing software for instructing a controller of a computing device to:
   receive, from a requestor, a crowd match request that identifies a select crowd;
   in response to the crowd match request, identify one or more matching crowds that match the select crowd at least to a predefined threshold degree based on aggregate profiles of the select crowd and the one or more matching crowds; and
   effect delivery of status updates sent by users in at least one crowd of the one or more matching crowds to the requestor.

* * * * *